(12) United States Patent
Huang et al.

(10) Patent No.: US 12,488,538 B2
(45) Date of Patent: Dec. 2, 2025

(54) USING MACHINE LEARNING FOR SURFACE RECONSTRUCTION IN SYNTHETIC CONTENT GENERATION SYSTEMS AND APPLICATIONS

(71) Applicant: Nvidia Corporation, Santa Clara, CA (US)

(72) Inventors: Jiahui Huang, Beijing (CN); Francis Williams, Brooklyn, NY (US); Zan Gojcic, Zurich (CH); Matan Atzmon, Toronto (CA); Or Litany, Sunnyvale, CA (US); Sanja Fidler, Toronto (CA)

(73) Assignee: Nvidia Corporation, Santa Clara, CA (US)

( * ) Notice: Subject to any disclaimer, the term of this patent is extended or adjusted under 35 U.S.C. 154(b) by 187 days.

(21) Appl. No.: 18/169,825

(22) Filed: Feb. 15, 2023

(65) Prior Publication Data
US 2024/0296623 A1  Sep. 5, 2024

(51) Int. Cl.
*G06T 15/08* (2011.01)
*G06T 17/20* (2006.01)

(52) U.S. Cl.
CPC .............. *G06T 17/20* (2013.01); *G06T 15/08* (2013.01); *G06T 2210/56* (2013.01)

(58) Field of Classification Search
CPC ..... G06T 17/20; G06T 15/08; G06T 2210/56; G06T 2207/10028
See application file for complete search history.

(56) References Cited

U.S. PATENT DOCUMENTS

2020/0265653 A1*  8/2020  Hawkins ................. G06T 19/20

OTHER PUBLICATIONS

"Point cloud voxel classification of aerial urban LiDAR using voxel attributes and random forest approach"—Aljumaily et al. International Journal of Applied Earth Observation and Geoinformation. vol. 118. 2023. 103208. ISSN 1569-8432. https://doi.org/10.1016/j.jag.2023.103208 (Year: 2023).*

* cited by examiner

*Primary Examiner* — Antonio A Caschera
(74) *Attorney, Agent, or Firm* — Hogan Lovells US LLP

(57) ABSTRACT

Approaches presented herein provide for the reconstruction of implicit multi-dimensional shapes. In one embodiment, oriented point cloud data representative of an object can be obtained using a physical scanning process. The point cloud data can be provided as input to a trained density model that can infer density functions for various points. The points can be mapped to a voxel hierarchy, allowing density functions to be determined for those voxels at the various levels that are associated with at least one point of the input point cloud. Contribution weights can be determined for the various density functions for the sparse voxel hierarchy, and the weighted density functions combined to obtain a density field. The density field can be evaluated to generate a geometric mesh where points having a zero, or near-zero, value are determined to contribute to the surface of the object.

20 Claims, 18 Drawing Sheets

USING MACHINE LEARNING FOR SURFACE RECONSTRUCTION IN SYNTHETIC CONTENT GENERATION SYSTEMS AND APPLICATIONS

BACKGROUND

In various applications—such as digital mapping, simulation, and virtual environment generation, for example—there can be a need to digitally reconstruct one or more three-dimensional surfaces from a physical environment. A set of data points representative of one or more objects in the physical environment can be captured, such as by using LIDAR-based scanning or multi-camera imaging, where the data points correspond to locations on the surfaces of the objects or other geometry within the physical environment. Unfortunately, these point-based representations—as may correspond to at least one point cloud—are typically sparse, even for a large number of points, and often include a significant amount of noise. As such, reconstructions of three-dimensional (3D) surfaces based on these point clouds can be limited in accuracy, and can fail to capture fine detail of the geometry. While the number of points used can be increased to help improve accuracy, such an increase comes with a corresponding increase in compute cost and resource requirements, which may exceed the capacity of at least some systems or prohibit its use for certain operations, and obtaining additional points often requires a lengthier scanning process, which can be problematic for dynamic scenes—such as urban environments or roadways—where objects or geometry may shift over time.

BRIEF DESCRIPTION OF THE DRAWINGS

Various embodiments in accordance with the present disclosure will be described with reference to the drawings, in which.

DETAILED DESCRIPTION

Figure 1A:
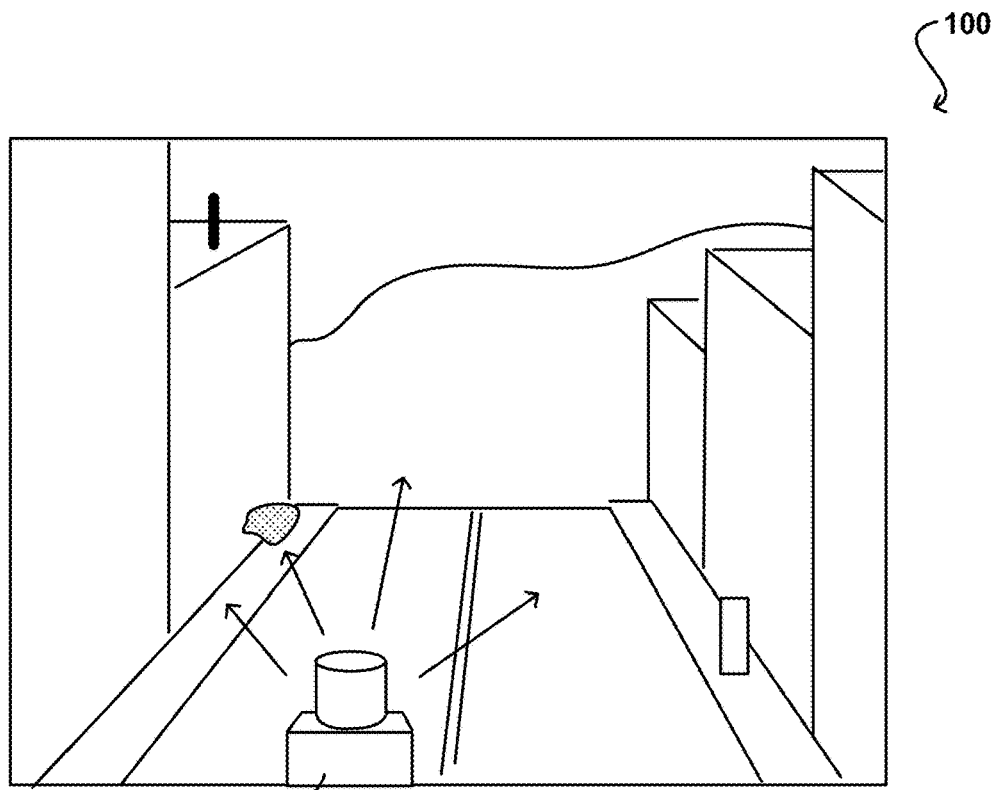
FIGS. 1A and 1B illustrate generating a point cloud representation of an environment using scan data in accordance with various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

The systems and methods described herein may be used by, without limitation, non-autonomous vehicles, semi-autonomous vehicles (e.g., in one or more advanced driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, trains, underwater craft, remotely operated vehicles such as drones, and/or other vehicle types. Further, the systems and methods described herein may be used for a variety of purposes, by way of example and without limitation, for machine control, machine locomotion, machine driving, synthetic data generation, model training or updating, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

Approaches in accordance with various illustrative embodiments provide for the digital reconstruction of the shapes or geometries of various objects, contours, or environments. In at least one embodiment, reconstruction of a three-dimensional (3D) implicit surface can be performed using input data such as a large scale, sparse point cloud that may include at least some amount of noise in the data. A basis function, or relatively small density function, can be determined for each individual point (or at least a subset of points) in an input point cloud, which can be indicative of the density at that point or location. A density value may be thought of as being higher in the interior of an object, which contains an amount of mass, than exterior to the object, which may not contain any significant mass or object. Surface points can therefore represent the transitions from high density objects to empty space with very low density. In at least one embodiment, the basis functions (or kernels, etc.) can be inferred by a machine learning model and associated with at voxels in a voxelized three-dimensional space, where individual points are mapped to the appropriate levels of the voxel hierarchy. Associating density functions with voxels instead of points allows for interaction between points to be limited to consideration within specific voxels. Mapping may include, for example, assigning points to voxels in a voxel hierarchy, where one or more (e.g., each) individual point(s) can reside within a voxel at the lowest level of the hierarchy, as well as one or more (e.g., each) parent voxel(s) of the hierarchy.

Once the basis functions are determined for the corresponding voxels, coefficients or weights can be determined to indicate how much each of these functions will contribute in aggregate. The resulting neural field can then be used to represent any shape in multi-dimensional space, such as by determining all points where the density values equal zero, then using these points to generate a geometric mesh.

In at least one embodiment, an optimization process can be performed to attempt to determine the contribution or weighting of each point function, with the result of the combined, weighted point function being a density field. The density field can be used to reconstruct the multi-dimensional surface with higher precision than would otherwise have been obtainable from the sparse point cloud. Such a gradient-based kernel formulation is robust to noise, scalable, and capable of handling large inputs while still producing high fidelity outputs. Such an approach can also be generalizable to various inputs, including out-of-distribution inputs, producing high-fidelity reconstructions of many different input point clouds, even in the presence of sparsity and noise. A model for use in such an approach can be trained directly on the union of diverse datasets, representing a wide variety of objects, and scenes, while only using dense points and sensor origins as supervision in at least one embodiment. Such an approach can also reconstruct point clouds consisting of millions of points in seconds or less, and can scale to extremely large inputs in an out-of-core fashion Variations of this and other such functionality can be used as well within the scope of the various embodiments as would be apparent to one of ordinary skill in the art in light of the teachings and suggestions contained herein.

Figure 1B:
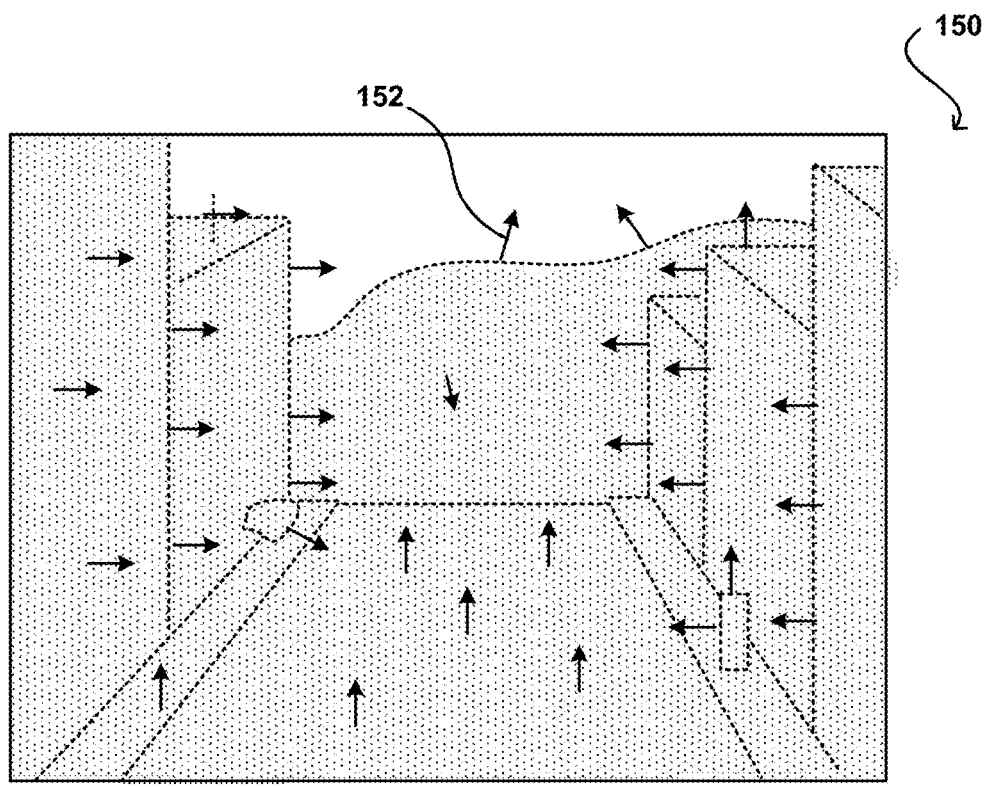

FIGS. 1A and 1B illustrate an example approach to obtaining three-dimensional (3D) data representative of an environment or surrounding geometry that can be performed in accordance with various embodiments. In FIG. 1A, a scanning device 102, such as may use LIDAR or another such scanning technology, may be positioned in, or move through, an environment such as that illustrated in the image 100 of FIG. 1 to attempt to obtain point data representative of the nearby geometry, as may relate to the shapes and surfaces of objects within a view of the scanning device. While a single scan at a single location may provide sufficient detail for some instances or embodiments, at least from a given point of view, multiple scans (or continuous scanning) may be performed at multiple locations or times in order to obtain point data that provides more information about the geometry of the environment, such as may correspond to views of an object from different sides or perspectives to allow for a more accurate reconstruction of the object as a whole. When performing such a scanning process, or receiving data from such a process once performed, the returned scan data can correspond to a set of points, where each point corresponds to a scan location where a given scan—such as one of a set of projected laser points—intersects a surface. The set of points can include three-dimensional location data indicating a location of each point with respect to a default reference frame, origin, or point of reference. Collectively, the set of points corresponds to a point cloud, or point-based representation of the scanned environment in at least two or three dimensions, such as the point cloud illustrated in the image 150 of FIG. 1B. The point cloud when viewed in a virtual 3D space provides a point-based representation of represents the general shape or geometry of the environment, although the representation will lack fine detail due at least in part to limitations on the number of points captured, as well as the relative separation of those points in space. In some embodiments the scanner may provide surface normal data for each point, indicating a direction of normal vector 152 orthogonal to the respective surface at the location of the scan point. The storing of a normal vector (or direction) with a surface point helps provide information about the surface near that point, and a collection of points with surface normals can be used to better model the surfaces of multiple objects in a scene or environment, including determining which points correspond to which objects, surfaces, or surface regions. If normal information is not provided by a scanner, a normal determining algorithm, machine learning model, or other such approach can be used to determine or infer the normal vectors for individual points.

In at least one embodiment, a partial representation of a shape, surface, or geometry, such as a point cloud with surface normal information, can be provided as input to a three-dimensional (3D) reconstruction process, which can attempt recover the surface geometry from this partial representation or set of partial measurements. It should be understood that reconstruction can be performed in other dimensionalities as well, such as for two-dimensional objects or for four-dimensional scenes that may change over time and thus have at least one temporal aspect or dimension. As mentioned, a partial representation such as 3D point cloud will often be relatively sparse, and may not represent fine detail of the shape(s) or surface(s) to be reconstructed. For a regular scanning pattern, the amount of detail may decrease with distance due to angular spread, such that the amount of detail for different portions of the scanned geometry can vary. For many scanning systems, there will be a maximum resolution that limits the minimum distances between scan points. Further, there will often be at least some amount of error or noise in the data, as may result from the physical characteristics or limitations of the scanning sensor or system, among other such factors. While the number of scans or scan points can be increased to obtain additional data, these larger data sets can increase the compute cost in processing these points to generate a multi-dimensional reconstruction, which may be too expensive for certain applications or operations, particularly those that may be time sensitive. Other factors may impact accuracy of the scan data as well, as may relate to the state of the environment, motion of the objects, as well as partial obstructions or occlusions, among other such factors.

In order to reconstruct a target geometry in accordance with at least one embodiment, a sparse set of "oriented" points, or points with accompanying surface normal data, that were sampled from the surface of a shape can be mapped to a 3D implicit field. Such reconstruction will not be straightforward in many situations, however, as point clouds acquired from real-world sensors are often very large—as may include millions or billions of points—and vary in sampling density. As mentioned, the point data may also be corrupted with at least some amount of noise or error. Furthermore, since surfaces are continuous but points are discrete, there can be many potential solutions that may appear to be valid in explaining a given input, although at most one of these solutions will be sufficiently accurate. To address at least some of these issues, many existing approaches aim to recover surfaces that agree with the input points while satisfying some prior everywhere else in space. Various existing methods use an explicit prior, such as smoothness, while some learning-based approaches promote a likely reconstruction under a data-driven prior. There are various limitations to such approaches that inhibit their application in practical situations. Some of these approaches, while they may be fast, scalable, and able to handle diverse inputs, often suffer from quality issues in the presence of high noise or sparse inputs, often failing to reconstruct even simple geometry such as a ground plane. Existing learning-based approaches have been observed to handle large amounts of and sparse inputs, but often struggle to generalize to out-of-distribution shapes and sampling densities. These generalization issues can be attributed, at least in part, to the fact that these learning-based methods struggle to exploit large and diverse amounts of data for training due at least in part to the time and cost needed for even a single training pass for moderately sized inputs, which then limits training to collections consisting of small point clouds. Furthermore, many existing methods rely on a preprocessing step to extract supervision in the form of occupancy or signed distance function, but in practice such preprocessing hinders the ability to easily use diverse datasets for training since most shape datasets consist of non-watertight shapes, open surfaces, or contain ghost geometry from which extracting supervision can be difficult.

In at least one embodiment, a Neural Kernel Fields (NKF)-based approach can be used to address the problem of generalization in 3D reconstruction. An NKF-based approach can learn a data-dependent kernel, and can predict a continuous occupancy field as a linear combination of this kernel supported on the input points. In using NKF, a kernel can be used to explicitly encode inductive bias, and a kernel linear interpolation problem can be solved at test time that always produces solutions that adhere to the inputs. Thus, by training on diverse shapes, NKF can learn an inductive bias for a general 3D reconstruction problem rather than for a specific dataset. While certain NKF-based approaches can achieve strong generalization results, these approaches often suffer from limitations that restrict their practical application. For example, such an approach requires solving a dense linear system since it uses a globally-supported kernel, and further generally cannot reconstruct inputs with more than a limited number of input points, such as around ten thousand input points. Further, such an approach often degrades poorly in the presence of noise due to its interpolation of exact positional occupancy constraints.

Approaches in accordance with various embodiments can take advantage of the excellent generalization capability of NKF while also being able to achieve a practical learning-based reconstruction method, where that method can be scalable, fast, and robust to noise. Such approaches can leverage the concept of a learned kernel for generalization, but can instead use a gradient-based kernel formulation that is robust to noise. Such approaches can also use an explicit voxel hierarchy structure 206, such as that illustrated in the example pipeline 200 of FIG. 2A, and compactly-supported kernels to make the interpolation problem sparse, multiscale, and capable of handling large inputs while still producing high fidelity outputs. Such approaches can result in a learning-based, yet out-of-the-box reconstruction method that can be applied to point clouds, or other such sparse geometric representations, in the field or in near-real time. In at least one embodiment, such an approach can generalize to out-of-distribution inputs, producing high-fidelity reconstructions, even in the presence of sparsity and noise. Training can be performed on a union of diverse datasets while only requiring dense oriented points as supervision, providing for significant training data scale. Further, point clouds consisting of millions of data points can be reconstructed in a very short period of time, such as on the order of a few seconds or less, and this reconstruction can scale to extremely large inputs in an out-of-core fashion.

A reconstruction system in accordance with at least one embodiment can predict or infer a 3D surface, given a point cloud (or other representation of the surface) where individual points of the representation are associated with surface normals, or normal vectors orthogonal to the surface at those points. This predicted surface can be encoded as the zero-level set of a Neural Kernel Field, for example, such as by using an implicit function represented as a weighted sum of learned, positive-definite basis functions that are conditioned on the input, and whose weights are computed using a linear optimization in the forward pass. These basis functions can be supported on a sparse voxel hierarchy which can be predicted from the input point cloud using a sparse convolutional network, and can depend at least in part on interpolated features at each voxel corner.

In at least one embodiment, a kernel can be placed at, or selected for, each of the points in an input point cloud. A shape can be represented by a variation in density in three-dimensional space, so at each point there can be a value that is indicative of the density at that point or location. A surface can be defined as all points in space whose density is 0 as part of a level set method that performs a density field reconstruction using a set of relatively small density functions centered at each of these points. A neural field can thus be used to represent any shape as a neural field or density in multi-dimensional space. The task of determining a shape can then be split into a number of smaller tasks of determining the appropriate densities at individual points of the point cloud, or other input representation. Individual points will each contribute to the overall density, and when properly combined added together the final shape can be obtained.

In at least one embodiment, the points of a point cloud can be provided as input to a machine learning model. The model can then infer a kernel, or other density representation, for each of (or at least a subset of) the individual input points. Once a predicted or inferred function is determined for the individual points, coefficients or weights can be determined for the various functions to indicate how much each of those functions will contribute in aggregate. For example, more important points can contribute more, or have higher weight values, than less important points. In at least one embodiment, an optimization process can be performed to attempt to determine the contribution or weighting of each point function, with the result of the combined, weighted point function being a density field. This field can then be tested against a set of points during training, and depending upon the type of training process the machine learning model can be rewarded for a successful test and penalized for an unsuccessful test, or test where the differences exceed an allowable amount of variation, etc.

Figure 2A:
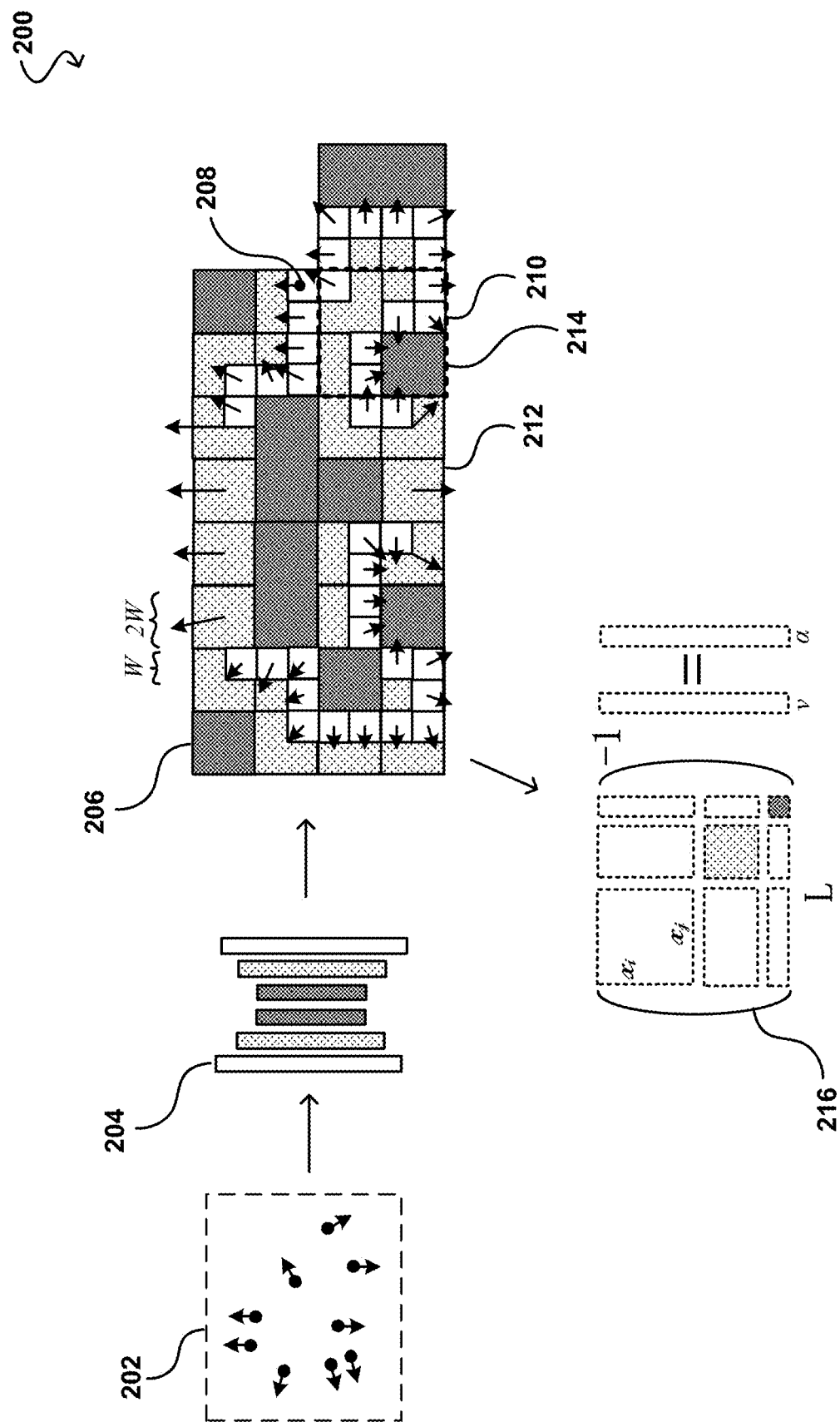
FIGS. 2A and 2B illustrates an example voxel-based approach to determining a 3D mesh representation from a point cloud, in accordance with various embodiments.

In at least one embodiment, the functions are density function that are stored at voxels in a voxelized three-dimensional space. By associating density functions with voxels instead of points, each point can be limited to consideration of interaction with neighboring points in the voxels, instead of having to consider interactions of points that may be far apart in the point cloud and may have negligible impact on each other, at least from a density standpoint. This may include, for example, assigning points to voxels in a voxel hierarchy, as illustrated in FIG. 2A, where each individual point can reside within a voxel at the lowest level of the hierarchy, as well as each parent voxel of the hierarchy. In at least one embodiment, a hierarchy can have a configurable number of levels, such as at least three, four, or five levels, among other such options. A density function, or kernel, can then be associated with one voxel at each level of the hierarchy that contains the associated point.

As illustrated in the pipeline portion 200 of FIG. 2A, a trained machine learning model 204 can infer a density function (or kernel, etc.) for each oriented point in a point cloud 202 (or at least a subset of those points). The points can be mapped to a voxel hierarchy 206, or other such representation, where each point will be in a small voxel 210 (white in the figure) at the bottom layer of the hierarchy, a large voxel 214 (dark in the figure, with size illustrated by the dashed line box) that is a parent of the small voxel at the top level of the hierarchy, as well as at least one voxel 212 (shaded in the figure) in an intermediate layer (the voxel illustrated by reference 212 in the figure is for clarity of size and differentiation, but it should be understood that voxel 212 in the figure is not a voxel at a higher layer that is a parent voxel of voxel 210 at the bottom layer). Each point will then be associated with one voxel at each layer, although voxels other than at the lowest layer may be associated with more than one point. The voxels at each layer of the hierarchy will contribute to the overall density field. A density function (or basis function or kernel, etc.) can be predicted that can be associated with these voxels. In this example, the voxels that are associated with points and/or density functions can be sparse, as they are associated with surface points of one or more objects, and not points interior or exterior to those objects. In at least some embodiments, voxels in the hierarchy that are not associated with points or density functions can be removed from consideration in order to reduce the amount of data to be stored and processed. As mentioned, the density functions can have their interaction considerations localized to specific voxels, or groups of adjacent voxels, which can further reduce the resources needed for computation. Example density functions, such as those presented below, can perform reconstruction similar to Poisson reconstruction, that is suitable for a sparse voxel grid.

Once the density functions are predicted and associated with voxels of the hierarchy 206, the pipeline can attempt to determine the relative contributions of each of these functions. In at least one embodiment, a sparse linear system 216 can be determined where many of the entries will be zero values. The linear system 216 can then be used to calculate the contribution of each density function inside each respective voxel. Thus, in this example where a given oriented point will be associated with three voxels, each of those three voxels will have a corresponding density function that contributes to the final density field. The relative contribution of the density functions for each of those voxels can then be assigned a scalar weight or relative coefficient. In at least one embodiment, an approach to determining the scalar weights can involve attempting to determine a contribution pattern wherein the sum of the individual density functions evaluate to a zero value, as in this approach it can be desirable for the final density of the surface points to also have a zero value. An appropriate interpolation algorithm can be used to then determine the relative weights as presented in more detail below.

In at least one embodiment, the sizes of the voxels and the number of levels in the voxel hierarchy can be predetermined. The values can be adjustable, however, as may be configurable by a user or application. If fixed values are used to train a machine learning model to infer the kernels to be associated with each voxel, then the values may be those that were used during training. Values to use for a given reconstruction may depend upon various factors, such as the size of the scene, size of object features, or amount of fine detail needed. In some embodiment, a scene can be evaluated using a pre-processing step to attempt to determine the appropriate values of the voxel hierarchy to be used to represent the 3D environment of the input point cloud.

Figure 2B:
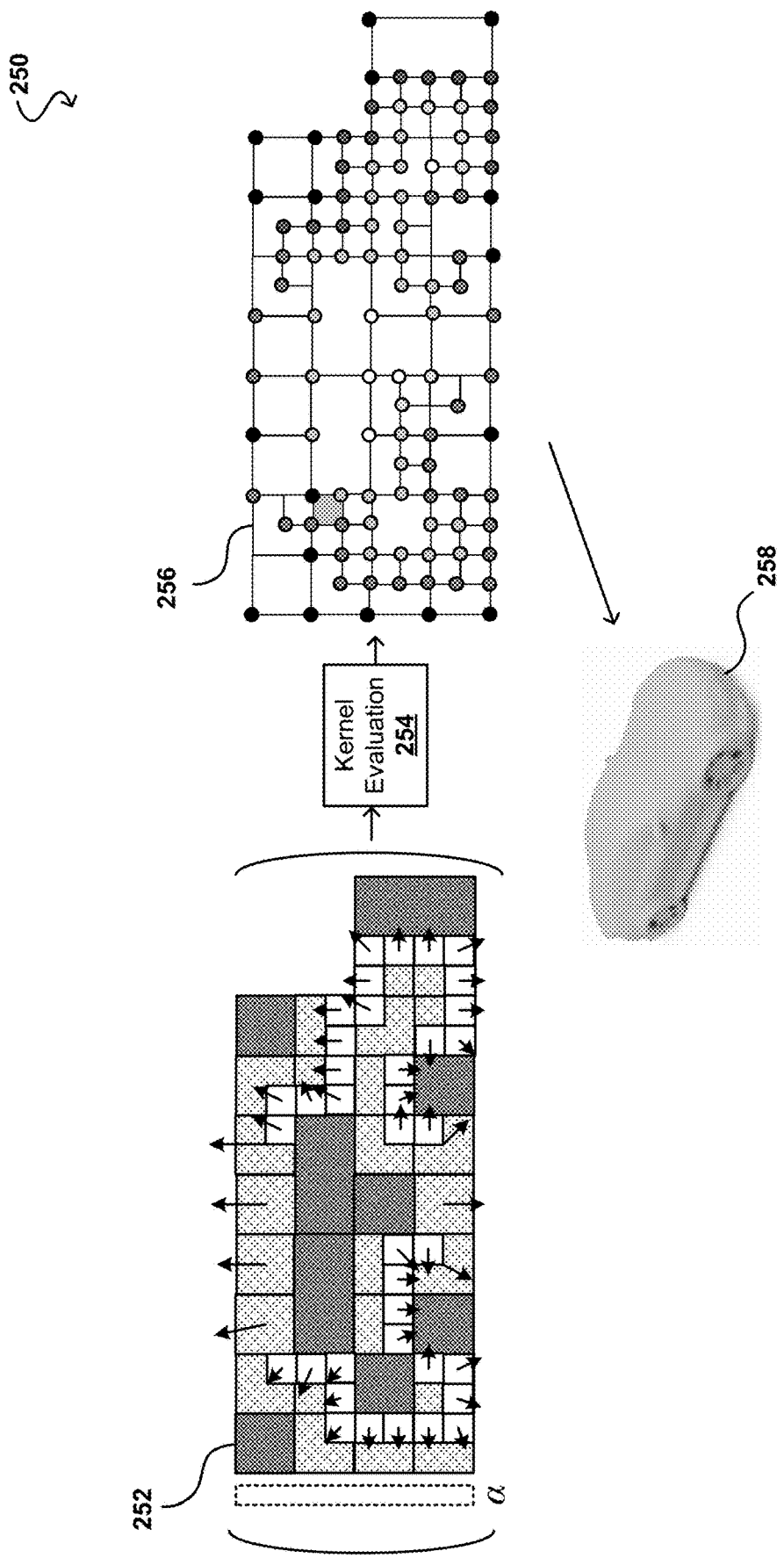

Once the weights or coefficients $\alpha$ have been determined for the basis functions for the various voxels of the hierarchy 252, those coefficients can then be applied to that hierarchy or field and evaluated as illustrated in the pipeline view 250 of FIG. 2B. In this example, this evaluation is performed using a kernel evaluation module 254, component, process, or operation. The kernel evaluation model can attempt to evaluate this density field, including the coefficients for the various basis functions, to generate an implicit surface 258, geometric mesh, or other such shape representation. The evaluation of this field can involve evaluating the density field at every corner of the voxel grid. A result 256 of this evaluation is a set of values at the various voxel corner points, where different colors represent different value ranges, from very positive to zero to very negative. As depicted in FIG. 2B, lighter points represent higher density, as these points are inside the object of interest, while darker points represent lower density as being outside the object. The values can be set such that the points that are near a surface have a near-zero density. The points that have a near zero value (or only zero values in some embodiments) will contribute to the generation of the surface 258 or mesh. This can be performed using a technique such as dual marching cubes, for example, which analyzes a density field representation 256 and constructs a geometric mesh. Other density field representations can be used as well, as may be based in part upon signed distance functions, truncated distributions, or occupancy functions, among other such options. A geometric mesh, such as a triangle mesh, can then be used to render a view of the object using any of a number of rendering options, where an image of the object is generated using a view of the geometric mesh from a given viewpoint, and then performing texture mapping, shading, and other such operations.

In the example pipeline illustrated in FIGS. 2A and 2B, with portions 200 and 250 illustrated, respectively, input can correspond to a point cloud 202 that includes a set of input points Xin, where at least some (if not all) of those points have corresponding normals Nin. This point cloud can be fed as input to a neural network 204, or trained machine learning model, that can predict a sparse hierarchy 206 of voxel grids containing features as well as normals in each voxel. Given the points and associated normals, a forward pass through such a model can be used to predict an implicit surface as a weighted sum of learned kernels. In such an approach, the input can be fed to a sparse convolutional neural network (CNN) that predicts a voxel hierarchy with features at each corner. These features can define a collection of learned basis functions, which are centered at each voxel in the hierarchy.

An example point feature 208 is illustrated in the voxel hierarchy 206, as may be given by:

$$\phi_\theta^{(l)}(x) \in \mathbb{R}^d$$

The voxel hierarchy in this example includes small voxels 210 of width W at a bottom layer of the hierarchy, medium sized voxels 212 of width 2W in a middle layer of the hierarchy, and large voxels 214 of width 4W at a top layer of the hierarchy, where voxels of the top layer may correspond to between 0 and 4 middle layer voxels, as well as to between 0 and 16 bottom layer voxels, although different numbers and sizes of voxels, and voxel layers, can be used as well within the scope of various embodiments. As illustrated, voxels can be identified that include features as well as normals. This predicted hierarchy 206 and feature field can then be used to construct a sparse linear system 216 that can be used to solve for a set of per-voxel coefficients α. The linear system in this example corresponds to a gram matrix arising from a kernel which depends on the predicted features, illustrated as L and v in FIG. 2A but mathematically defined in Eq. (4) below. To extract the predicted surface 258, as illustrated in the portion of the pipeline 250 of FIG. 2B, the function values can be evaluated at the voxel corners 256, using a kernel evaluation component 254. The kernel evaluation can use a linear combination of learned kernel basis functions, as given by Eq. (1) below, followed by a dual marching cubes approach. In at least one embodiment, a set of weights can be obtained or determined for these basis functions by, for example, solving a linear system that encourages the predicted implicit field to have a zero value near the input points, and to have gradients which agree with the input normals. In at least one embodiment, a geometric mask can also be predicted that outputs where, in space, to extract the final surface 258, trimming away spurious geometry. For example, a stop sign will be a relatively flat object and will not have significant geometry behind the sign that is also part of the sign, so an example process can predict the stop sign geometry and can indicate that there is likely no geometry behind this sign region, so an effective mask can be generated that prevents reconstruction from considering or inferring additional geometry behind this sign that is also part of this sign. This can correspond to a distance-based, inferred geometric masking field in at least one embodiment, where there may not be sufficient geometric data to otherwise make a confident inference as to the 3D shape of the object. This masking field can limit the region in 3D space where the implicit field for an object is defined. Such an approach can help to avoid the generation of spurious geometry for an object.

A reconstruction system in accordance with at least one embodiment can attempt to predict a sparse voxel hierarchy given, for example, input points $X_{in} = \{x_j^{in} \in \mathbb{R}^3\}_{j=1}^{n_{in}}$, input normals $N_{in} = \{n_j^{in} \in \mathbb{R}^3\}_{j=1}^{n_{in}}$, and a voxel size W. A hierarchy of L voxel grids can be predicted using a convolutional backbone digesting the point cloud with concatenated normal $[x_j^{in}, n_j^{in}] \in \mathbb{R}^6$ for each point. Each of the predicted voxel grid can have $n^{(1)}, \ldots, n^{(L)}$ voxels with widths W, 2W, ... $2^L$W, respectively, and any voxel with center $x_i^{(l-1)}$ at level l−1 is contained within some voxel with center $x_j^{(l)}$ at level l. Such a system can additionally predict features $z_i^{(l)} \in \mathbb{R}^d$ and normals $n_i^{(l)} \in \mathbb{R}^3$ for each voxel in the hierarchy. The features $z_i^{(l)}$ can be employed to predict a feature field $\phi_\theta^{(l)}$ $(x|X_{in}, N_{in})$ which lifts the coordinates $x \in \mathbb{R}^3$ to d-dimensional vectors via Bézier interpolation followed by an MLP. FIGS. 3B and 3C illustrate an example 2D representation of a predicted hierarchy and features. In these figures, an implicit field f(x) is represented as a sum of kernel basis functions on a sparse voxel hierarchy 330. Each voxel 360 with center $x_i^{(l)}$ contributes one kernel basis function with support in the one-ring around $x_i^{(l)}$ as illustrated in FIG. 3C.

In at least one embodiment, the reconstructed shape can be encoded as the zero-level set of a 3D implicit field $f_\theta$: $\mathbb{R}^3 \to \mathbb{R}$ defined as a hierarchical Neural Kernel Field, or a weighted combination of positive definite kernels which are conditioned on the inputs and centered at the midpoints $x_i^{(l)} \in \mathbb{R}^3$ of voxels in the predicted hierarchy:

$$f_\theta(x|X_{in}, N_{in}) = \sum_{i,l} \alpha_i^{(l)} K_\theta^{(l)}\left(x, x_i^{(l)} | X_{in}, N_{in}\right). \quad (1)$$

Here, $\alpha_i^{(l)} \in R$ are scalar coefficients at the $i^{th}$ voxel at level l=1, ... L in the hierarchy, and $K_\theta^{(l)}$ is the predicted kernel for the $l^{th}$ level defined as:

$$K_\theta^{(l)}(x, x') = \langle \phi_\theta^{(l)}(x; X_{in}, N_{in}), \phi_\theta^{(l)}(x'; X_{in}, N_{in}) \rangle \cdot K_b^{(l)}(x, x'), \quad (2)$$

where $\langle \bullet, \bullet \rangle$ is the dot product, $\phi_\theta^{(l)}: \mathbb{R}^3 \to \mathbb{R}^d$ is the feature field extracted from the hierarchy, and $K_b^{(l)}: \mathbb{R}^3 \times \mathbb{R}^3 \to \mathbb{R}$ is the Bézier Kernel, which decays to zero in a one-voxel (at level-l) neighborhood around its origin.

Given a predicted voxel hierarchy, learned kernels $K_\theta^{(l)}$, and predicted normals $n_j^{(l)}$, an implicit surface can be computed by finding optimal coefficients, such as may be given by:

$$\alpha^* = \{\{\alpha_i^{(l)}\}_{l=1}^L\}_{i=1}^{n^{(l)}}$$

for the kernel field (1). These coefficients can be calculated by minimizing the following loss in the forward pass of the relevant model (omitting the conditioning of $f_\theta$ on $X_{in}, N_{in}$ for brevity):

$$\alpha^* = \operatorname*{argmin}_{\alpha_i^{(l)}} \sum_{l=1}^{L'} \sum_{i=1}^{n^{(l)}} \|\nabla_x f_\theta(x_i^{(l)}) - n_i^{(l)}\|_2^2 + \sum_{j=1}^{n_{in}} |f_\theta(x_j^{in})|^2, \quad (3)$$

where L'≤L is a hyper-parameter for the hierarchy. By minimizing this loss, the Neural Kernel Field $f_\theta$ can have a gradient which agrees with the normals at the voxel centers (hence regions around the surface), as well as a scalar value near zero at all the input points $X_{in}$. Since $f_\theta$ is linear in the parameters $\alpha_i^{(l)}$, optimal (or at least high quality) coefficients $\alpha^*$ can be determined by solving the linear system:

$$(Q^\top Q + G^\top G)\alpha = Q^\top n, \quad (4)$$

where n are the predicted normal vectors $n_i^{(l)}$ stacked into a single vector, $\alpha$ is the vector of coefficients $\alpha_i^{(l)}$, and $$G = [G^{(1)} \dots G^{(L)}], \quad (5)$$
$$Q = [Q^{(1)} \dots Q^{(L)}],$$
$$G_{i,j}^{(l)} = K_\theta(x_i^{in}, x_j^{(l)}), \, Q_{i,j}^{(l)} = \partial_{x_i^{(l')}} K_\theta(x_i^{(l')}, x_j^{(l)}) \quad (6)$$

are the gram matrix and partial derivatives of the gram matrix at the voxel centers where normals are defined, respectively. In this example, linear system (4) is sparse due to modulation with the compactly supported $K_b^{(l)}$, and positive definite by construction since it is a Gram matrix. As a result, Eq. (4) can be solved very efficiently on a GPU in at least one embodiment.

A predicted Neural Kernel Field $f_\theta$ can be defined on the entire voxel hierarchy, although at coarse levels far from the surface the NKF may contain unwanted geometry. To discard such geometry away from the predicted surface, an additional branch can be added to the backbone as $\varphi$: $\mathbb{R}^3 \to \{0,1\}$, which determines whether a point x should be trimmed ($\varphi(x)=0$) or kept ($\varphi(x)=1$). The branch originates from the immediate features of the backbone network and consists of a few linear layers with ReLU activations followed by a sigmoid. When the final surface is extracted, in at least one embodiment only vertices in certain regions, such as in regions where $\varphi(x) > 0.5$, are considered.

In at least one embodiment, a model can be trained using pairs such as may be given by $(X_{in}=\{x_i \in \mathbb{R}^3\}, O_{in}=\{o_i \in \mathbb{R}^3\})$ and $(X_{dense}=\{x_j\}, O_{dense}=\{o_j\})$. Here $X_{in}$ and $X_{dense}$ are noisy input points and dense supervision points, respectively, and $O_{in}$ and $O_{dense}$ represent the sensor origin for each input and supervision point, such as for a position in 3D space from which each point was acquired. Input and supervision normals $N_{in}$, $N_{dense}$ can be computed by fitting planes to points in a local neighborhood and orienting the normals to align with the directions from points to sensors. Such training requirements may impose no restrictions on the shapes being used for training. For example, one could use a single LiDAR frame as input and an accumulated LiDAR scan of a scene as supervision, alongside a noisy scan of a synthetic object as input and a dense noiseless scan of the same object as supervision.

Figure 3A:
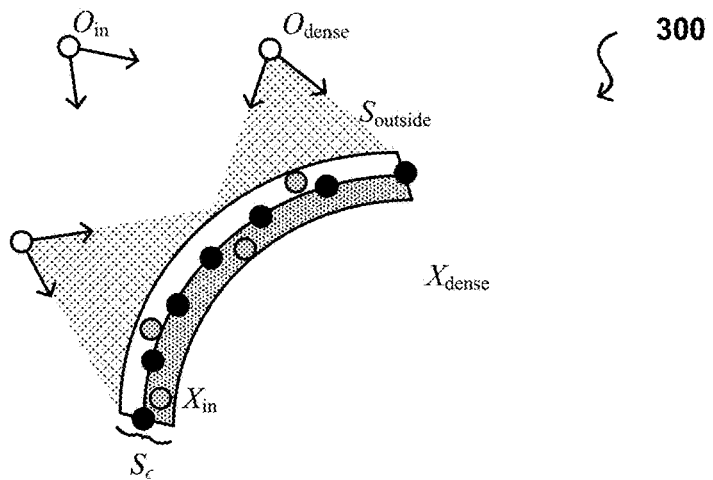
FIGS. 3A, 3B, and 3C illustrate a voxel-based approach to determining point contribution to a surface representation, in accordance with various embodiments.
Figure 3B:
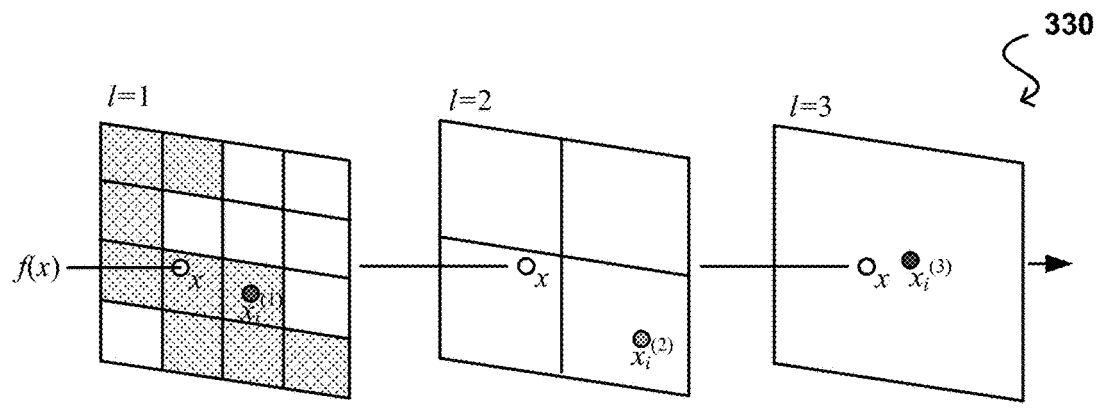
Figure 3C:
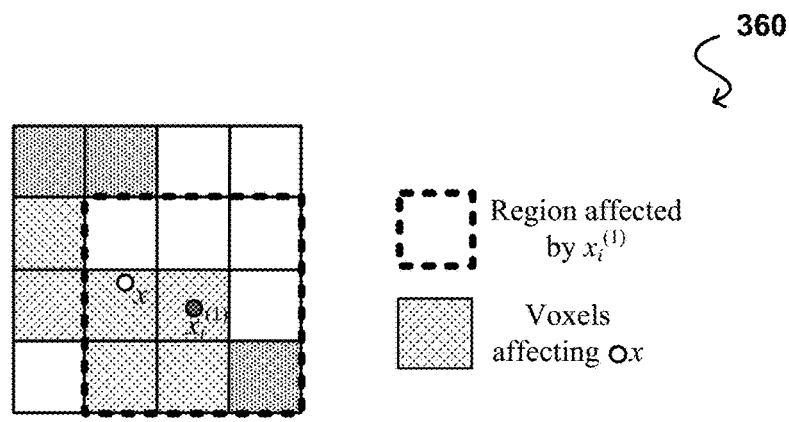

In order to define the loss terms used to supervise such a model, as illustrated in the arrangement 300 of FIG. 3A, at least two regions of space can be defined around the dense points $X_{dense}$:

$S_\epsilon$: points which are $\epsilon$ distance or less from $X_{dense}$ i.e. $\{x | \min_{x_j \in X_{dense}} \|x - x_j\|_2 < \epsilon\}$, $S_{outside}$: points which lie within the region enclosing points in $X_{dense}$ and their sensor origin in $O_{dense}$.

Then, given a predicted Neural Kernel Field $f_\theta(x)$, back-propagation can be performed through the loss function, such as may be given by:

$$\mathcal{L}_{surf}(f) = \mathbb{E}_{x \in X_{dense}}[\|f(x)\|_1]$$

$\mathcal{L}_{tsdf}(f) = \mathbb{E}_{x \in S_\epsilon}[\|f(x) - tsdf(x, X_{dense})\|_1]$ where tsdf (x, $X_{dense}$) is the ground-truth truncated signed distance computed from $X_{dense}$ using nearest neighbors;

$$\mathcal{L}_{normal}(f) = \mathbb{E}_{n \in N_{in}}\left[1 - \left\langle \frac{\nabla_x f(x)}{\|\nabla_x f(x)\|_2}, n \right\rangle\right];$$

$$\mathcal{L}_{outside}(f) = \mathbb{E}_{x \in S_{outside}} e^{-\beta \|f(x)\|_1}, \text{ where } \beta = 0.1$$

$$\mathcal{L}_{min\text{-}surf}(f) = \mathbb{E}_{x \in S_\epsilon}\left[\frac{\eta \pi^{-1}}{\eta^2 + f(x)^2}\right], \text{ where } \eta = 0.5.$$

Here $\mathcal{L}_{surf}$ ensures that the implicit function is zero near the ground truth surface, $\mathcal{L}_{tsdf}$ ensures that the implicit field undergoes a sign change near the surface, $\mathcal{L}_{normal}$ ensures the gradient of the predicted implicit agrees with the dense normals, $\mathcal{L}_{outside}$ ensures there is no geometry far away from the surface, and $\mathcal{L}_{min\text{-}surf}$ acts as a regularizer encouraging the predicted implicit surface to have minimal area. In at least one embodiment, structure prediction and masking losses, or other such losses, can be computed as well. The model can be trained in an end-to-end fashion using gradient descent by back-propagating through the sum of the selected loss functions.

Figure 4:
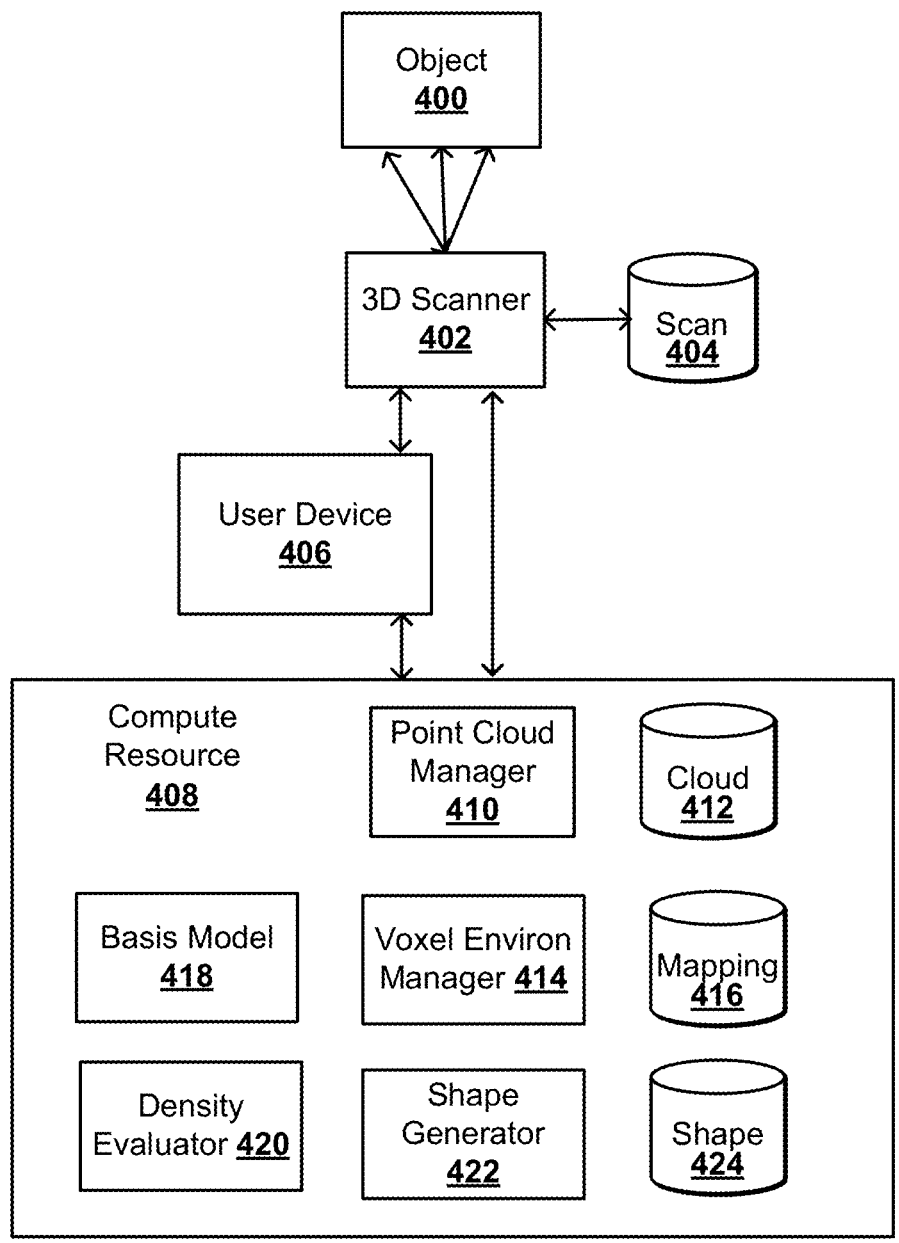
FIG. 4 illustrates an example system for reconstructing a surface using a set of surface point data, in accordance with various embodiments.

FIG. 4 illustrates components of an example system for performing implicit surface reconstruction that can be used in accordance with at least one embodiment. In this example, a 3D scanner 402 or other such device can perform one or more scans of a physical object 400 to collect a set of scan data 404, where that scan data may represent a point cloud comprised of oriented points corresponding to an intersection of a scan with a surface of the object 400. A compute resource 408, such as a remote or cloud-based server with relatively large capacity, can receive the scan data 404 for this object, whether directly or via a user device 406 in communication with the 3D scanner 402. In some embodiments, the user device 406 may obtain the scan data and allow a user to view and select the scan data to be analyzed by the compute resource. The compute resource 408, which in some embodiments may include multiple individual resources such as separate computers or compute instances, may include various modules or support various operations to be performed using the scan data 404 in order to reconstruct a multi-dimensional surface of the object 400. The operations can be performed using various hardware and software as discussed elsewhere herein, as may be performed on one or more processors, including but not limited to central processing units (CPUs), graphics processing units (GPUs), or data processing units (DPUs).

In this example, the scan data can be received to a point cloud manager 410 which can analyze the scan data to generate a point cloud (or other such representation) of oriented points using the scan data. The point cloud manager 410 can perform any pre-processing of the data, as may relate to formatting, data conversion, removal of spurious scan points, or noise reduction, among other such options, to generate point cloud data 412, or another such representation, that can be input to a basis model 418, such as a machine learning model trained to infer basis functions or density functions for the various points of the point cloud data 412. Any appropriate model can be used, such as a sparse convolutional neural network (CNN) or transformer, among other such options. A voxel environment manager 414 can generate or maintain a voxel hierarchy including a number of levels and sizes of voxels selected for a reconstruction task, and can generate and maintain mapping data 416, which maps the points of the point cloud data 412 to the voxels of the voxel hierarchy. As mentioned, the basis model 418 can infer basis functions that are associated with each voxel of the hierarchy, at each level of the hierarchy, that is associated with a point of the point cloud data in at least one embodiment. A density evaluator 420 can perform a number of operations using the basis functions determined for various voxels of the hierarchy, including determining coefficients for the various basis functions to obtain a weighted density field representation, then performing a kernel or density evaluation to obtain a set of density values at the points of the various voxels. A shape generator 422 can then use this data to generate a geometric shape, mesh, or implicit surface, such as though use of a generative neural network, and can store this shape data 424 for use in a subsequent operation, such as for rendering an image including a view of this object. Additional or alternative modules may be included as well, such as those that generate geometric masks or perform rendering based on the reconstructed shape data 424.

Approaches to performing surface reconstruction using such a system can provide high levels of accuracy, even for point clouds with varying degrees of noise, as well as strong scalability and generalizability across both domains and densities, even for scans with very low densities. In at least one embodiment, a pipeline such as that illustrated in FIGS. 2A and 2B can be implemented using a system as illustrated in FIG. 4. An example compute resource 408 may include at least a graphics processing unit (GPU), such as a single V100 Tensor Core GPU with 8 CPU cores, which can be accelerated using, for example, PyTorch and CUDA from NVIDIA Corporation. Operations on a sparse hierarchy such as convolution, neighborhood querying, and interpolations can be based on a customized VDB-tree structure that is highly efficient and scalable. A sparse linear solver in such a pipeline can use a Jacobi-preconditioned conjugate gradient method, for example, that can work jointly with the sparse hierarchy for fast inference.

As mentioned, various scanning or multi-dimensional mapping systems can be used to obtain point data for a shape, surface, contour, environment, or other object or location for which surface reconstruction is to be performed. The type of device used may depend at least in part upon the type or size of surface to be digitally reconstructed. For example, it may be desirable to obtain a large-scale dataset corresponding to an urban setting, such as a downtown area of a city. To obtain the data, one or more vehicles may maneuver around the town, such as by driving, flying, or hovering over different parts of the town at different times or locations. The vehicle(s) may each contain a scanning, mapping, or other such device or system for obtaining point data representative of the surfaces within a view or range of the device or system at each location or time. In one embodiment, such a system can include a sparse 32-beam LiDAR with 0-5 cm ray distance noise and 0-3° pose noise. In another embodiment, a noise-free highly-dense 256-beam LiDAR can be used, which also may be beneficial to provide for ground-truth supervision during testing. Accumulated LiDAR points in some embodiments may be cropped into chunks, such as 51.2×51.2 m² chunks for ease of benchmarking. In at least one embodiment, appropriate voxel sizes can be set, such as voxel sizes W=10 cm or W=30 cm to achieve sufficient surface completeness. While increasing feature dimension can help to obtain slightly better performance, the influence of voxel sizes is more prominent in at least some embodiments. Hierarchies can be removed from the linear solver by setting $\{\alpha_t^{(l)}|l>0\}$ to 0, for example, or to remove the gradient-based matrices $Q^TQ$ ('w/o Grad.'), but such approaches were observed to lead to a degraded performance for many datasets. The number of points to be captured for a scan may be adjustable in at least some embodiments, whether automatically, manually, or otherwise, and may be set to a mean/min/max number of input points such as 490 k/290 k/820 k points.

Figure 5:
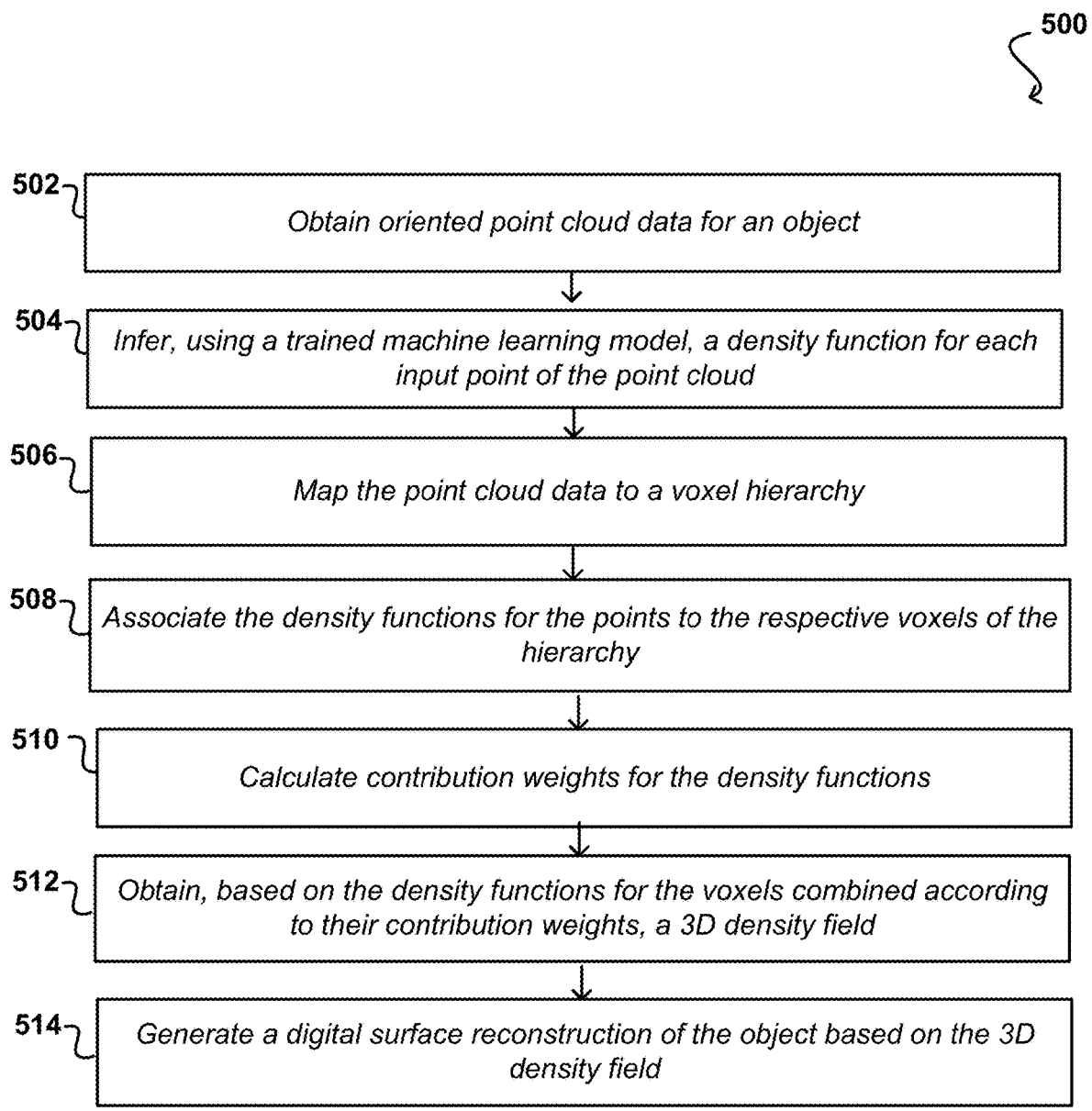
FIG. 5 illustrates an example process for reconstructing a surface using a set of surface point data that can be performed in accordance with various embodiments.

FIG. 5 illustrates an example process 500 for performing implicit surface reconstruction that can be performed in accordance with at least one embodiment. It should be understood that for this and other processes presented herein that there may be additional, fewer, or alternative steps performed or similar or alternative orders, or at least partially in parallel, within the scope of the various embodiments unless otherwise specifically stated. Further, although this example is described with respect to point clouds and voxels, it should be understood that other types of data representations can be used as well within the scope of various embodiments. In this example process, oriented point cloud data is obtained 502 for an object, where that point cloud data can include a set of points in multi-dimensional space corresponding to a shape or surface of the object, along with surface normals for the points that provide an indication or the orientation of the shape at those various points. The point cloud data can have been obtained through the scanning or analysis of a physical object in at least one embodiment. A trained machine learning model can take this oriented point cloud data as input, and can infer 504 a density function for each input point of the point cloud. Before or after (or concurrent with) the inferring of the density functions, the point cloud data can be mapped 506 to a voxel hierarchy, where each point can be associated with a voxel at each level of the hierarchy from a parent voxel to an end node (or lowest level) voxel. The density functions for the points can be associated 508 with the respective voxels of the hierarchy. In some embodiments, the neural network can instead directly infer density functions for individual voxels based on the point cloud data points that are associated with that voxel. Once density functions for the various voxels are obtained, contribution weights can be calculated 510 for the individual density functions. A 3D density field can then be obtained 512 that is based on the various density functions as combined using the respective contribution weights. A digital surface reconstruction, such as a geometric mesh, can be generated 514 for the object based on this 3D density field, such as where surface points are identified by points with (or near) zero value in the density field. The geometric mesh can then be used for operations such as rendering or modeling that involve the object. Such an approach can provide for high levels of quality, efficiency, and scalability, while enjoying strong generalization to previously unencountered data. Such an approach can also help to makes deep-learning-based surface reconstruction more practical for general use than prior approaches. In some embodiments, further improvements can be obtained through various optimizations, such as may involve use of more expressive kernel models, as well as reducing the memory footprint to allow for even larger-scale reconstructions.

In various examples or use cases, such approaches to reconstruction can be performed in an offline process, where speed of reconstruction may not be critical. There may be other use cases, however, where the reconstruction may need to be done in near-real time. This can include, for example, the reconstruction of objects in an environment for purposes of real-time navigation or collision avoidance, such as for autonomous vehicles or unmanned aircraft. Another example use case involves operation of a robotic assembly, where accurate 3D geometric reconstruction may be important for ensuring proper and intended operation of the robotic assembly with respect to one or more objects in a nearby environment. In at least one embodiment, a speed of reconstruction can be improved by reducing a number of input points when fine detail is not needed, such as where it is important to understand the basic geometric shape of an object for purposes such as object avoidance but where fine detail is not needed, as might be useful for other operations such as high resolution rendering. In some embodiments, the density of captured data points can be reduced based on distance, such that nearby objects have a higher level of detail where quick decisions need to be made, but objects in the distance may have fewer (or no) points captured or analyzed, where there is substantially more time that can be used to make decisions with respect to those distant objects. Where possible, hardware acceleration can be used to improve performance as well. Where fine detail is not needed, at least some amount of sampling can be performed on an input data cloud to further reduce processing time and requirements. In at least some embodiments, a user or application can thus balance between detail and speed as appropriate for the operation.

For operations such as may be related to autonomous vehicle or unmanned aerial vehicle navigation, there may be a sequence of scans captured over time that can be used to update or supplement the point cloud with additional data, including location and surface normal information for points in the cloud. For an offline process, these scans can be analyzed to generate a more accurate point cloud that is used to generate the reconstruction. For an online process, points can be added to the point cloud as they are captured, and may be removed from the point cloud after they are beyond a range of consideration, in order to have an updated point cloud for a current location, as well as to allow for refinement of surface points when their location data can be determined from multiple scans instead of a single scan, which can help to average out noise or reduce uncertainty. In some embodiments, there may be no temporal accumulation, however, and each reconstruction that is performed can be performed for data from a single scan.

As discussed, aspects of various approaches presented herein can be lightweight enough to execute on a device such as a client device, such as a personal computer or gaming console, in real time. Such processing can be performed on, or for, content that is generated on, or received by, that client device or received from an external source, such as streaming data or other content received over at least one network. In some instances, the processing and/or determination of this content may be performed by one of these other devices, systems, or entities, then provided to the client device (or another such recipient) for presentation or another such use.

Figure 6:
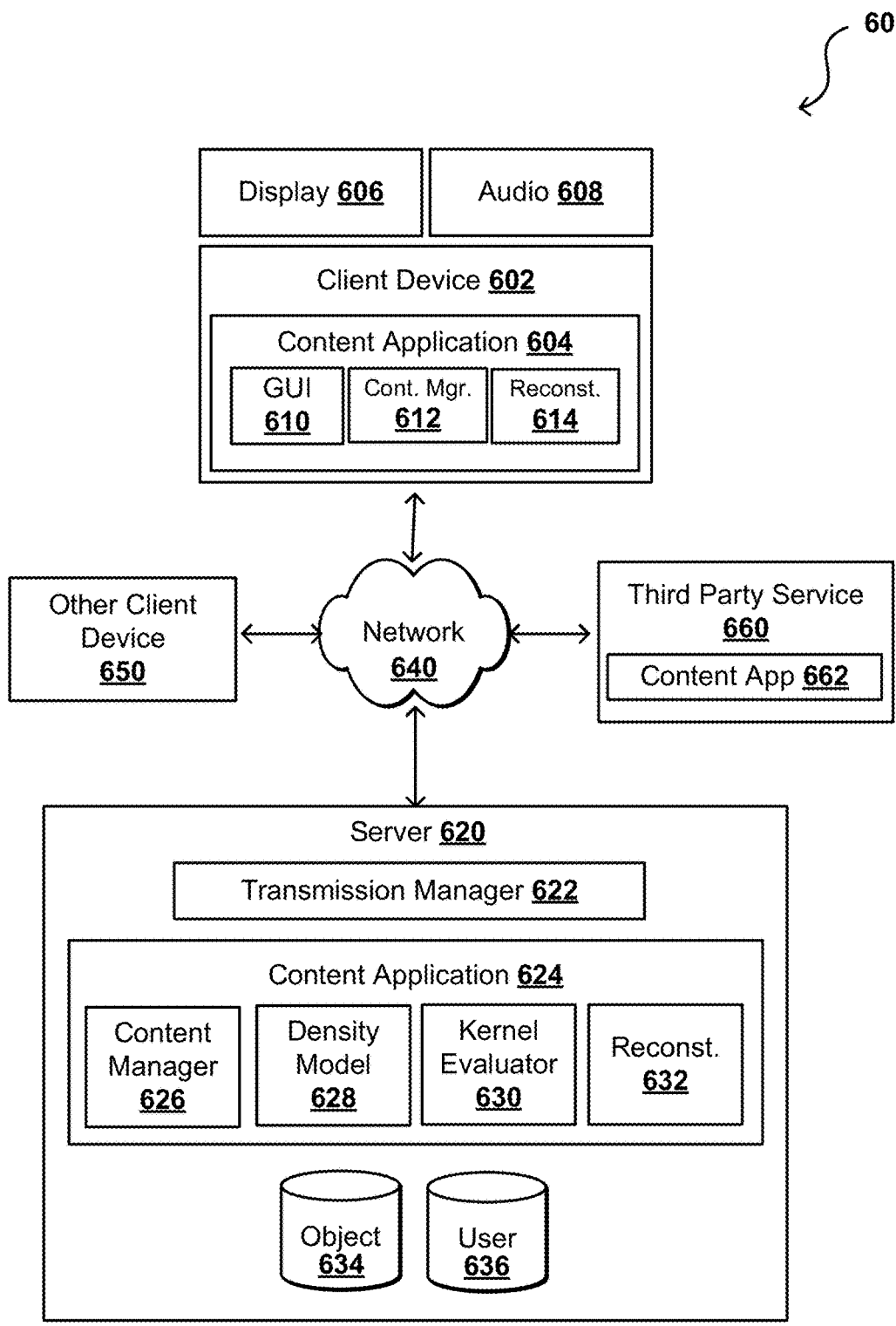
FIG. 6 illustrates components of a distributed system that can be used to perform surface reconstruction, according to at least one embodiment.

As an example, FIG. 6 illustrates an example networked system configuration 600 that can be used to provide, generate, modify, encode, process, and/or transmit image data or other such content. In at least one embodiment, a client device 602 can generate or receive data for a session using components of a content application 604 on client device 602 and data stored locally on that client device. In at least one embodiment, a content application 624 executing on a server 620 (e.g., a cloud server or edge server) may initiate a session associated with at least one client device 602, as may use a session manager and user data stored in a user database 636, and can cause content such as one or more object representations—such as point clouds—from an object repository 634 to be selected by a content manager 626 for processing. A content manager 626 may work with a reconstruction module 632 to generate a digital representation of the selected object, such as may be used to render content to be provided for presentation via the client device 602. In at least one embodiment, this reconstruction module 628 can use one or more density models 628 to infer density functions for points of the object representations, where the model can be trained or updated using a training module or system that is on, or in communication with, the server 620. The information inferred by the density model can be processed by a kernel evaluator 630 in order to generate a weighted density field, for example, which can be passed to the reconstruction module for use in generating a digital reconstruction of the object. At least a portion of the generated content may be transmitted to the client device 602 using an appropriate transmission manager 622 to send by download, streaming, or another such transmission channel. An encoder may be used to encode and/or compress at least some of this data before transmitting to the client device 602. In at least one embodiment, the client device 602 receiving such content can provide this content to a corresponding content application 604, which may also or alternatively include a graphical user interface 610, content manager 612, and reconstruction module 614 for use in selecting, providing, synthesizing, modifying, or using content for presentation (or other purposes) on or by the client device 602. A decoder may also be used to decode data received over the network(s) 640 for presentation via client device 602, such as image or video content through a display 606 and audio, such as sounds and music, through at least one audio playback device 608, such as speakers or headphones. In at least one embodiment, at least some of this content may already be stored on, rendered on, or accessible to client device 602 such that transmission over network 640 is not required for at least that portion of content, such as where that content may have been previously downloaded or stored locally on a hard drive or optical disk. In at least one embodiment, a transmission mechanism such as data streaming can be used to transfer this content from server 620, or user database 636, to client device 602. In at least one embodiment, at least a portion of this content can be obtained, enhanced, and/or streamed from another source, such as a third party service 660 or other client device 650, that may also include a content application 662 for generating, enhancing, or providing content. In at least one embodiment, portions of this functionality can be performed using multiple computing devices, or multiple processors within one or more computing devices, such as may include a combination of CPUs and GPUs.

In this example, these client devices can include any appropriate computing devices, as may include a desktop computer, notebook computer, set-top box, streaming device, gaming console, smartphone, tablet computer, VR headset, AR goggles, wearable computer, or a smart television. Each client device can submit a request across at least one wired or wireless network, as may include the Internet, an Ethernet, a local area network (LAN), or a cellular network, among other such options. In this example, these requests can be submitted to an address associated with a cloud provider, who may operate or control one or more electronic resources in a cloud provider environment, such as may include a data center or server farm. In at least one embodiment, the request may be received or processed by at least one edge server, that sits on a network edge and is outside at least one security layer associated with the cloud provider environment. In this way, latency can be reduced by enabling the client devices to interact with servers that are in closer proximity, while also improving security of resources in the cloud provider environment.

In at least one embodiment, such a system can be used for performing graphical rendering operations. In other embodiments, such a system can be used for other purposes, such as for providing image or video content to test or validate autonomous machine applications, or for performing deep learning operations. In at least one embodiment, such a system can be implemented using an edge device, or may incorporate one or more Virtual Machines (VMs). In at least one embodiment, such a system can be implemented at least partially in a data center or at least partially using cloud computing resources.

Inference and Training Logic

Figure 7A:
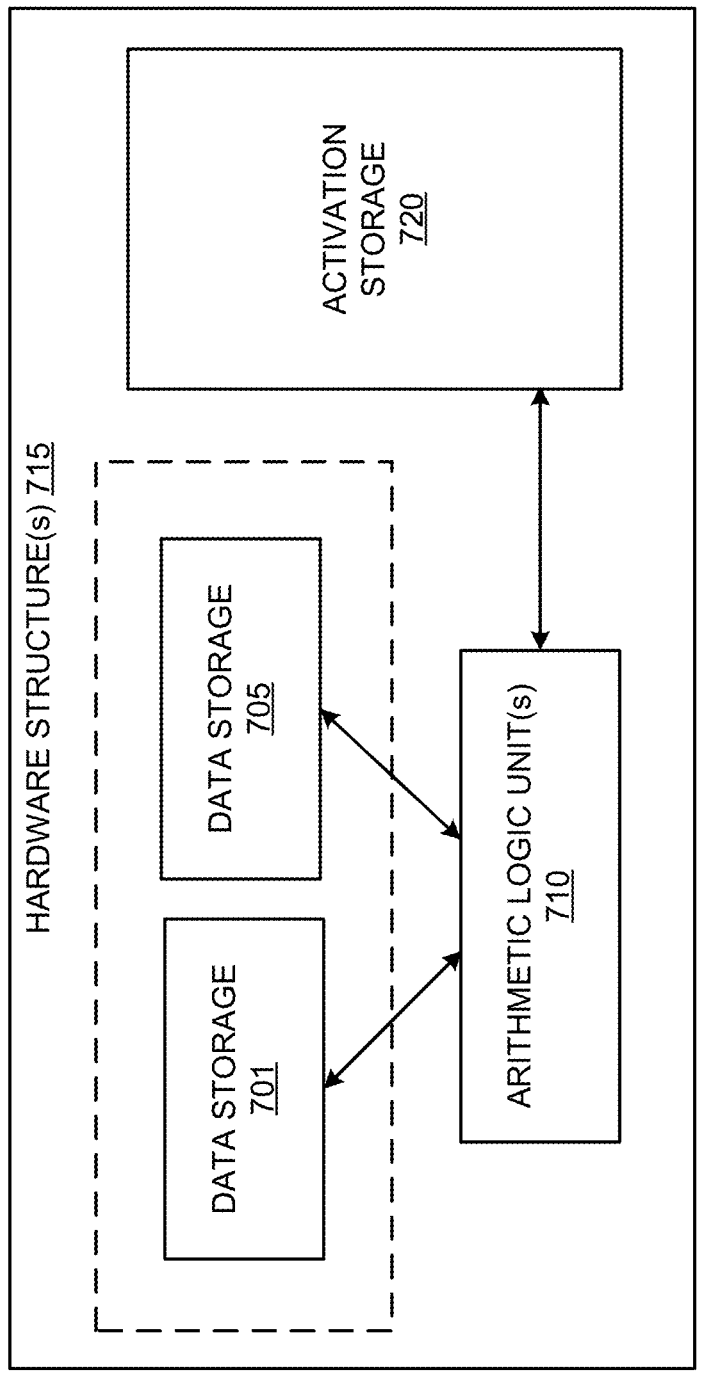
FIG. 7A illustrates inference and/or training logic, according to at least one embodiment.

FIG. 7A illustrates inference and/or training logic 715 used to perform inferencing and/or training operations associated with one or more embodiments. Details regarding inference and/or training logic 715 are provided below in conjunction with FIGS. 7A and/or 7B.

In at least one embodiment, inference and/or training logic 715 may include, without limitation, code and/or data storage 701 to store forward and/or output weight and/or input/output data, and/or other parameters to configure neurons or layers of a neural network trained and/or used for inferencing in aspects of one or more embodiments. In at least one embodiment, training logic 715 may include, or be coupled to code and/or data storage 701 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, code and/or data storage 701 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 701 may be included with other on-chip or off-chip data storage, including a processor's L1, L2, or L3 cache or system memory.

In at least one embodiment, any portion of code and/or data storage 701 may be internal or external to one or more processors or other hardware logic devices or circuits. In at least one embodiment, code and/or code and/or data storage 701 may be cache memory, dynamic randomly addressable memory ("DRAM"), static randomly addressable memory ("SRAM"), non-volatile memory (e.g., Flash memory), or other storage. In at least one embodiment, choice of whether code and/or code and/or data storage 701 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 715 may include, without limitation, a code and/or data storage 705 to store backward and/or output weight and/or input/output data corresponding to neurons or layers of a neural network trained and/or used for inferencing in aspects of one or more embodiments. In at least one embodiment, code and/or data storage 705 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 715 may include, or be coupled to code and/or data storage 705 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, any portion of code and/or data storage 705 may be included with other on-chip or off-chip data storage, including a processor's L1, L2, or L3 cache or system memory. In at least one embodiment, any portion of code and/or data storage 705 may be internal or external to on one or more processors or other hardware logic devices or circuits. In at least one embodiment, code and/or data storage 705 may be cache memory, DRAM, SRAM, non-volatile memory (e.g., Flash memory), or other storage. In at least one embodiment, choice of whether code and/or data storage 705 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 701 and code and/or data storage 705 may be separate storage structures. In at least one embodiment, code and/or data storage 701 and code and/or data storage 705 may be same storage structure. In at least one embodiment, code and/or data storage 701 and code and/or data storage 705 may be partially same storage structure and partially separate storage structures. In at least one embodiment, any portion of code and/or data storage 701 and code and/or data storage 705 may be included with other on-chip or off-chip data storage, including a processor's L1, L2, or L3 cache or system memory.

In at least one embodiment, inference and/or training logic 715 may include, without limitation, one or more arithmetic logic unit(s) ("ALU(s)") 710, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 720 that are functions of input/output and/or weight parameter data stored in code and/or data storage 701 and/or code and/or data storage 705. In at least one embodiment, activations stored in activation storage 720 are generated according to linear algebraic and or matrix-based mathematics performed by ALU(s) 710 in response to performing instructions or other code, wherein weight values stored in code and/or data storage 705 and/or code and/or data storage 701 are used as operands along with other values, such as bias values, gradient information, momentum values, or other parameters or hyperparameters, any or all of which may be stored in code and/or data storage 705 or code and/or data storage 701 or another storage on or off-chip.

In at least one embodiment, ALU(s) 710 are included within one or more processors or other hardware logic devices or circuits, whereas in another embodiment, ALU(s) 710 may be external to a processor or other hardware logic device or circuit that uses them (e.g., a co-processor). In at least one embodiment, ALUs 710 may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage 701, code and/or data storage 705, and activation storage 720 may be on same processor or other hardware logic device or circuit, whereas in another embodiment, they may be in different processors or other hardware logic devices or circuits, or some combination of same and different processors or other hardware logic devices or circuits. In at least one embodiment, any portion of activation storage 720 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 720 may be cache memory, DRAM, SRAM, non-volatile memory (e.g., Flash memory), or other storage. In at least one embodiment, activation storage 720 may be completely or partially within or external to one or more processors or other logical circuits. In at least one embodiment, choice of whether activation storage 720 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors. In at least one embodiment, inference and/or training logic 715 illustrated in FIG. 7A may be used in conjunction with an application-specific integrated circuit ("ASIC"), such as Tensorflow® Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7A may be used in conjunction with central processing unit ("CPU") hardware, graphics processing unit ("GPU") hardware or other hardware, such as field programmable gate arrays ("FPGAs").

Figure 7B:
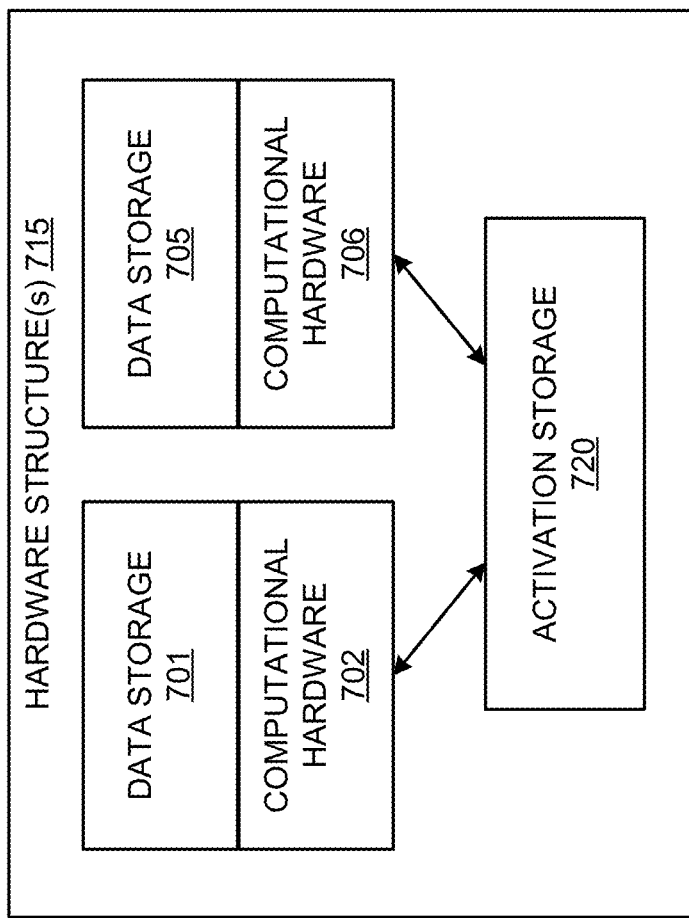
FIG. 7B illustrates inference and/or training logic, according to at least one embodiment.

FIG. 7B illustrates inference and/or training logic 715, according to at least one or more embodiments. In at least one embodiment, inference and/or training logic 715 may include, without limitation, hardware logic in which computational resources are dedicated or otherwise exclusively used in conjunction with weight values or other information corresponding to one or more layers of neurons within a neural network. In at least one embodiment, inference and/or training logic 715 illustrated in FIG. 7B may be used in conjunction with an application-specific integrated circuit (ASIC), such as Tensorflow® Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7B may be used in conjunction with central processing unit (CPU) hardware, graphics processing unit (GPU) hardware or other hardware, such as field programmable gate arrays (FPGAs). In at least one embodiment, inference and/or training logic 715 includes, without limitation, code and/or data storage 701 and code and/or data storage 705, which may be used to store code (e.g., graph code), weight values and/or other information, including bias values, gradient information, momentum values, and/or other parameter or hyperparameter information. In at least one embodiment illustrated in FIG. 7B, each of code and/or data storage 701 and code and/or data storage 705 is associated with a dedicated computational resource, such as computational hardware 702 and computational hardware 706, respectively. In at least one embodiment, each of computational hardware 702 and computational hardware 706 comprises one or more ALUs that perform mathematical functions, such as linear algebraic functions, only on information stored in code and/or data storage 701 and code and/or data storage 705, respectively, result of which is stored in activation storage 720.

In at least one embodiment, each of code and/or data storage 701 and 705 and corresponding computational hardware 702 and 706, respectively, correspond to different layers of a neural network, such that resulting activation from one "storage/computational pair 701/702" of code and/or data storage 701 and computational hardware 702 is provided as an input to "storage/computational pair 705/706" of code and/or data storage 705 and computational hardware 706, in order to mirror conceptual organization of a neural network. In at least one embodiment, each of storage/computational pairs 701/702 and 705/706 may correspond to more than one neural network layer. In at least one embodiment, additional storage/computation pairs (not shown) subsequent to or in parallel with storage computation pairs 701/702 and 705/706 may be included in inference and/or training logic 715.

Data Center

Figure 8:
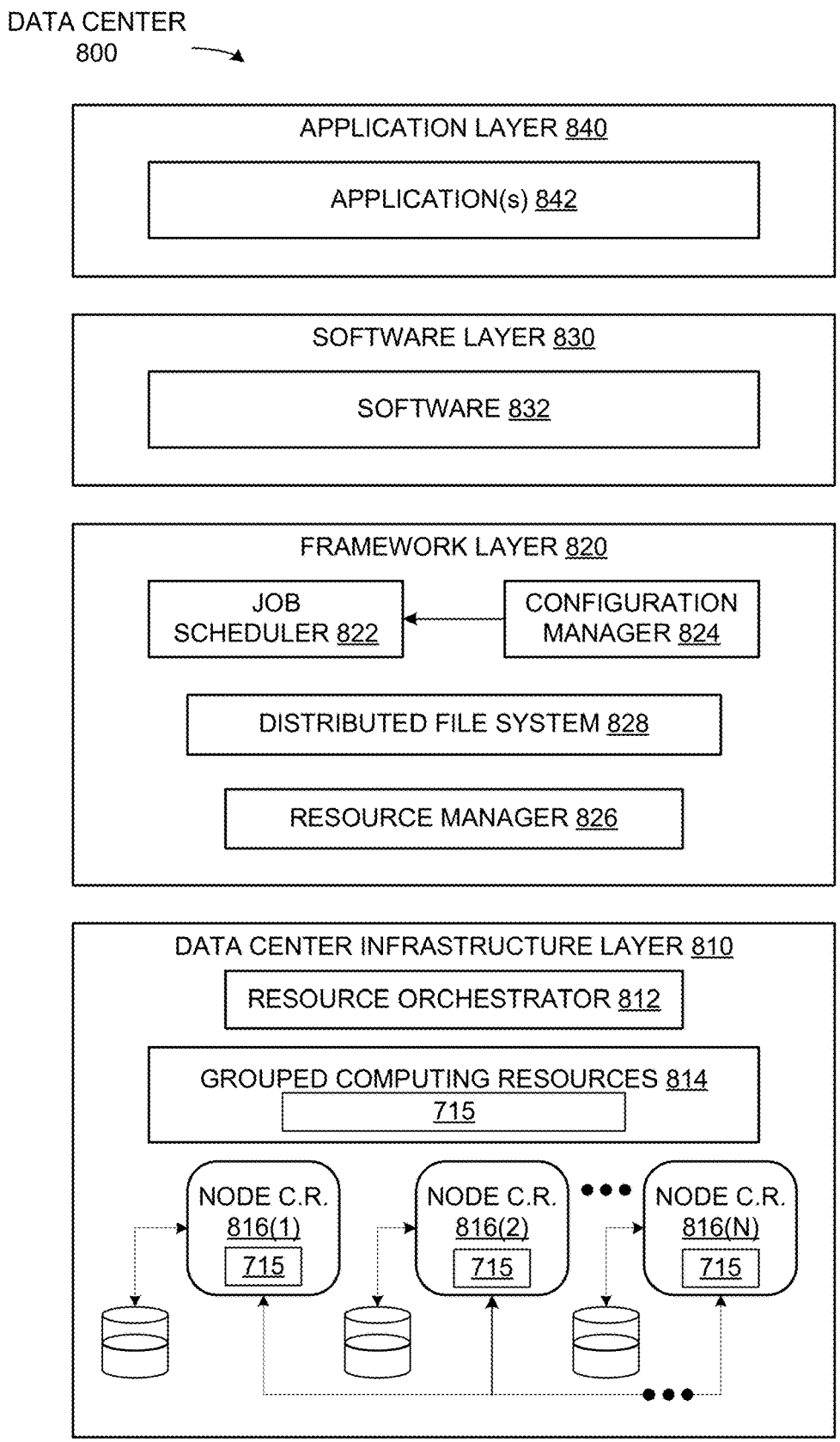
FIG. 8 illustrates an example data center system, according to at least one embodiment.

FIG. 8 illustrates an example data center 800, in which at least one embodiment may be used. In at least one embodiment, data center 800 includes a data center infrastructure layer 810, a framework layer 820, a software layer 830, and an application layer 840.

In at least one embodiment, as shown in FIG. 8, data center infrastructure layer 810 may include a resource orchestrator 812, grouped computing resources 814, and node computing resources ("node C.R.s") 816(1)-816(N), where "N" represents any whole, positive integer. In at least one embodiment, node C.R.s 816(1)-816(N) may include, but are not limited to, any number of central processing units ("CPUs") or other processors (including accelerators, field programmable gate arrays (FPGAs), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 816(1)-816(N) may be a server having one or more of above-mentioned computing resources.

In at least one embodiment, grouped computing resources 814 may include separate groupings of node C.R.s housed within one or more racks (not shown), or many racks housed in data centers at various geographical locations (also not shown). Separate groupings of node C.R.s within grouped computing resources 814 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 812 may configure or otherwise control one or more node C.R.s 816(1)-816(N) and/or grouped computing resources 814. In at least one embodiment, resource orchestrator 812 may include a software design infrastructure ("SDI") management entity for data center 800. In at least one embodiment, resource orchestrator may include hardware, software or some combination thereof.

In at least one embodiment, as shown in FIG. 8, framework layer 820 includes a job scheduler 822, a configuration manager 824, a resource manager 826 and a distributed file system 828. In at least one embodiment, framework layer 820 may include a framework to support software 832 of software layer 830 and/or one or more application(s) 842 of application layer 840. In at least one embodiment, software 832 or application(s) 842 may respectively include web-based service software or applications, such as those provided by Amazon Web Services, Google Cloud and Microsoft Azure. In at least one embodiment, framework layer 820 may be, but is not limited to, a type of free and open-source software web application framework such as Apache Spark™ (hereinafter "Spark") that may use distributed file system 828 for large-scale data processing (e.g., "big data"). In at least one embodiment, job scheduler 822 may include a Spark driver to facilitate scheduling of workloads supported by various layers of data center 800. In at least one embodiment, configuration manager 824 may be capable of configuring different layers such as software layer 830 and framework layer 820 including Spark and distributed file system 828 for supporting large-scale data processing. In at least one embodiment, resource manager 826 may be capable of managing clustered or grouped computing resources mapped to or allocated for support of distributed file system 828 and job scheduler 822. In at least one embodiment, clustered or grouped computing resources may include grouped computing resource 814 at data center infrastructure layer 810. In at least one embodiment, resource manager 826 may coordinate with resource orchestrator 812 to manage these mapped or allocated computing resources.

In at least one embodiment, software 832 included in software layer 830 may include software used by at least portions of node C.R.s 816(1)-816(N), grouped computing resources 814, and/or distributed file system 828 of framework layer 820. The one or more types of software may include, but are not limited to, Internet web page search software, e-mail virus scan software, database software, and streaming video content software.

In at least one embodiment, application(s) 842 included in application layer 840 may include one or more types of applications used by at least portions of node C.R.s 816(1)-816(N), grouped computing resources 814, and/or distributed file system 828 of framework layer 820. One or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 824, resource manager 826, and resource orchestrator 812 may implement any number and type of self-modifying actions based on any amount and type of data acquired in any technically feasible fashion. In at least one embodiment, self-modifying actions may relieve a data center operator of data center 800 from making possibly bad configuration decisions and possibly avoiding underused and/or poor performing portions of a data center.

In at least one embodiment, data center 800 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 800. In at least one embodiment, trained machine learning models corresponding to one or more neural networks may be used to infer or predict information using resources described above with respect to data center 800 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Inference and/or training logic 715 are used to perform inferencing and/or training operations associated with one or more embodiments. Details regarding inference and/or training logic 715 are provided below in conjunction with FIGS. 7A and/or 7B. In at least one embodiment, inference and/or training logic 715 may be used in system FIG. 8 for inferencing or predicting operations based, at least in part, on weight parameters calculated using neural network training operations, neural network functions and/or architectures, or neural network use cases described herein.

Such components can be used to reconstruct an implicit 3D surface by generating a density field based on weighted contributions of density functions for a plurality of oriented surface points.

Computer Systems

Figure 9:
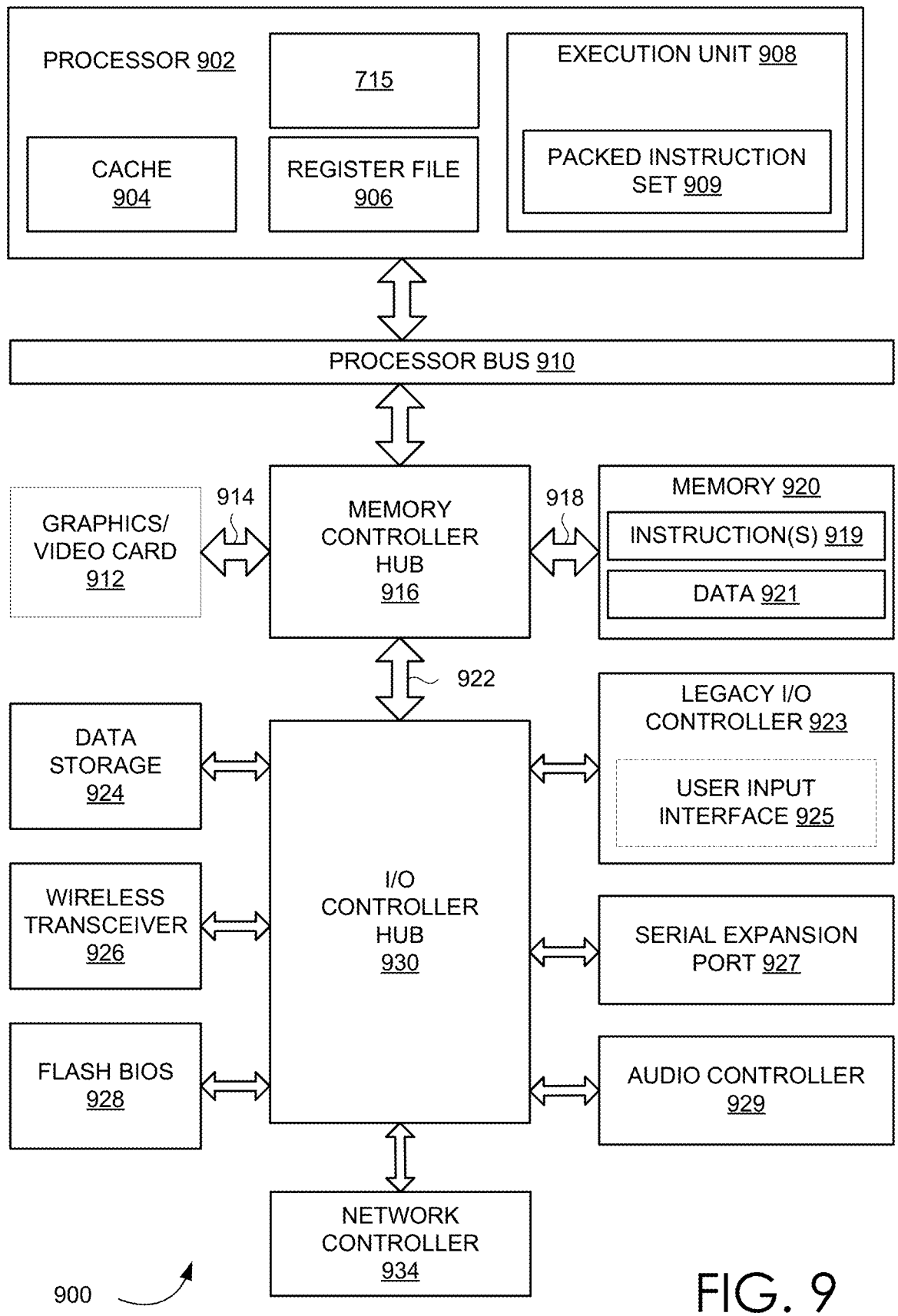
FIG. 9 illustrates a computer system, according to at least one embodiment.

FIG. 9 is a block diagram illustrating an exemplary computer system, which may be a system with interconnected devices and components, a system-on-a-chip (SOC) or some combination thereof 900 formed with a processor that may include execution units to execute an instruction, according to at least one embodiment. In at least one embodiment, computer system 900 may include, without limitation, a component, such as a processor 902 to employ execution units including logic to perform algorithms for process data, in accordance with present disclosure, such as in embodiment described herein. In at least one embodiment, computer system 900 may include processors, such as PENTIUM® Processor family, Xeon™, Itanium®, XScale™ and/or StrongARM™, Intel® Core™, or Intel®

Nervana™ microprocessors available from Intel Corporation of Santa Clara, California, although other systems (including PCs having other microprocessors, engineering workstations, set-top boxes and like) may also be used. In at least one embodiment, computer system 900 may execute a version of WINDOWS' operating system available from Microsoft Corporation of Redmond, Wash., although other operating systems (UNIX and Linux for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, or any other system that may perform one or more instructions in accordance with at least one embodiment.

In at least one embodiment, computer system 900 may include, without limitation, processor 902 that may include, without limitation, one or more execution units 908 to perform machine learning model training and/or inferencing according to techniques described herein. In at least one embodiment, computer system 900 is a single processor desktop or server system, but in another embodiment computer system 900 may be a multiprocessor system. In at least one embodiment, processor 902 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 902 may be coupled to a processor bus 910 that may transmit data signals between processor 902 and other components in computer system 900.

In at least one embodiment, processor 902 may include, without limitation, a Level 1 ("L1") internal cache memory ("cache") 904. In at least one embodiment, processor 902 may have a single internal cache or multiple levels of internal cache. In at least one embodiment, cache memory may reside external to processor 902. Other embodiments may also include a combination of both internal and external caches depending on particular implementation and needs. In at least one embodiment, register file 906 may store different types of data in various registers including, without limitation, integer registers, floating point registers, status registers, and instruction pointer register.

In at least one embodiment, execution unit 908, including, without limitation, logic to perform integer and floating point operations, also resides in processor 902. In at least one embodiment, processor 902 may also include a microcode ("ucode") read only memory ("ROM") that stores microcode for certain macro instructions. In at least one embodiment, execution unit 908 may include logic to handle a packed instruction set 909. In at least one embodiment, by including packed instruction set 909 in an instruction set of a general-purpose processor 902, along with associated circuitry to execute instructions, operations used by many multimedia applications may be performed using packed data in a general-purpose processor 902. In one or more embodiments, many multimedia applications may be accelerated and executed more efficiently by using full width of a processor's data bus for performing operations on packed data, which may eliminate need to transfer smaller units of data across processor's data bus to perform one or more operations one data element at a time.

In at least one embodiment, execution unit 908 may also be used in microcontrollers, embedded processors, graphics devices, DSPs, and other types of logic circuits. In at least one embodiment, computer system 900 may include, without limitation, a memory 920. In at least one embodiment, memory 920 may be implemented as a Dynamic Random Access Memory ("DRAM") device, a Static Random Access Memory ("SRAM") device, flash memory device, or other memory device. In at least one embodiment, memory 920 may store instruction(s) 919 and/or data 921 represented by data signals that may be executed by processor 902.

In at least one embodiment, system logic chip may be coupled to processor bus 910 and memory 920. In at least one embodiment, system logic chip may include, without limitation, a memory controller hub ("MCH") 916, and processor 902 may communicate with MCH 916 via processor bus 910. In at least one embodiment, MCH 916 may provide a high bandwidth memory path 918 to memory 920 for instruction and data storage and for storage of graphics commands, data and textures. In at least one embodiment, MCH 916 may direct data signals between processor 902, memory 920, and other components in computer system 900 and to bridge data signals between processor bus 910, memory 920, and a system I/O 922. In at least one embodiment, system logic chip may provide a graphics port for coupling to a graphics controller. In at least one embodiment, MCH 916 may be coupled to memory 920 through a high bandwidth memory path 918 and graphics/video card 912 may be coupled to MCH 916 through an Accelerated Graphics Port ("AGP") interconnect 914.

In at least one embodiment, computer system 900 may use system I/O 922 that is a proprietary hub interface bus to couple MCH 916 to I/O controller hub ("ICH") 930. In at least one embodiment, ICH 930 may provide direct connections to some I/O devices via a local I/O bus. In at least one embodiment, local I/O bus may include, without limitation, a high-speed I/O bus for connecting peripherals to memory 920, chipset, and processor 902. Examples may include, without limitation, an audio controller 929, a firmware hub ("flash BIOS") 928, a wireless transceiver 926, a data storage 924, a legacy I/O controller 923 containing user input and keyboard interfaces 925, a serial expansion port 927, such as Universal Serial Bus ("USB"), and a network controller 934. Data storage 924 may comprise a hard disk drive, a floppy disk drive, a CD-ROM device, a flash memory device, or other mass storage device.

In at least one embodiment, FIG. 9 illustrates a system, which includes interconnected hardware devices or "chips", whereas in other embodiments, FIG. 9 may illustrate an exemplary System on a Chip ("SoC"). In at least one embodiment, devices may be interconnected with proprietary interconnects, standardized interconnects (e.g., PCIe) or some combination thereof. In at least one embodiment, one or more components of computer system 900 are interconnected using compute express link (CXL) interconnects.

Inference and/or training logic 715 are used to perform inferencing and/or training operations associated with one or more embodiments. Details regarding inference and/or training logic 715 are provided below in conjunction with FIGS. 7A and/or 7B. In at least one embodiment, inference and/or training logic 715 may be used in system FIG. 9 for inferencing or predicting operations based, at least in part, on weight parameters calculated using neural network training operations, neural network functions and/or architectures, or neural network use cases described herein.

Such components can be used to reconstruct an implicit 3D surface by generating a density field based on weighted contributions of density functions for a plurality of oriented surface points.

Figure 10:
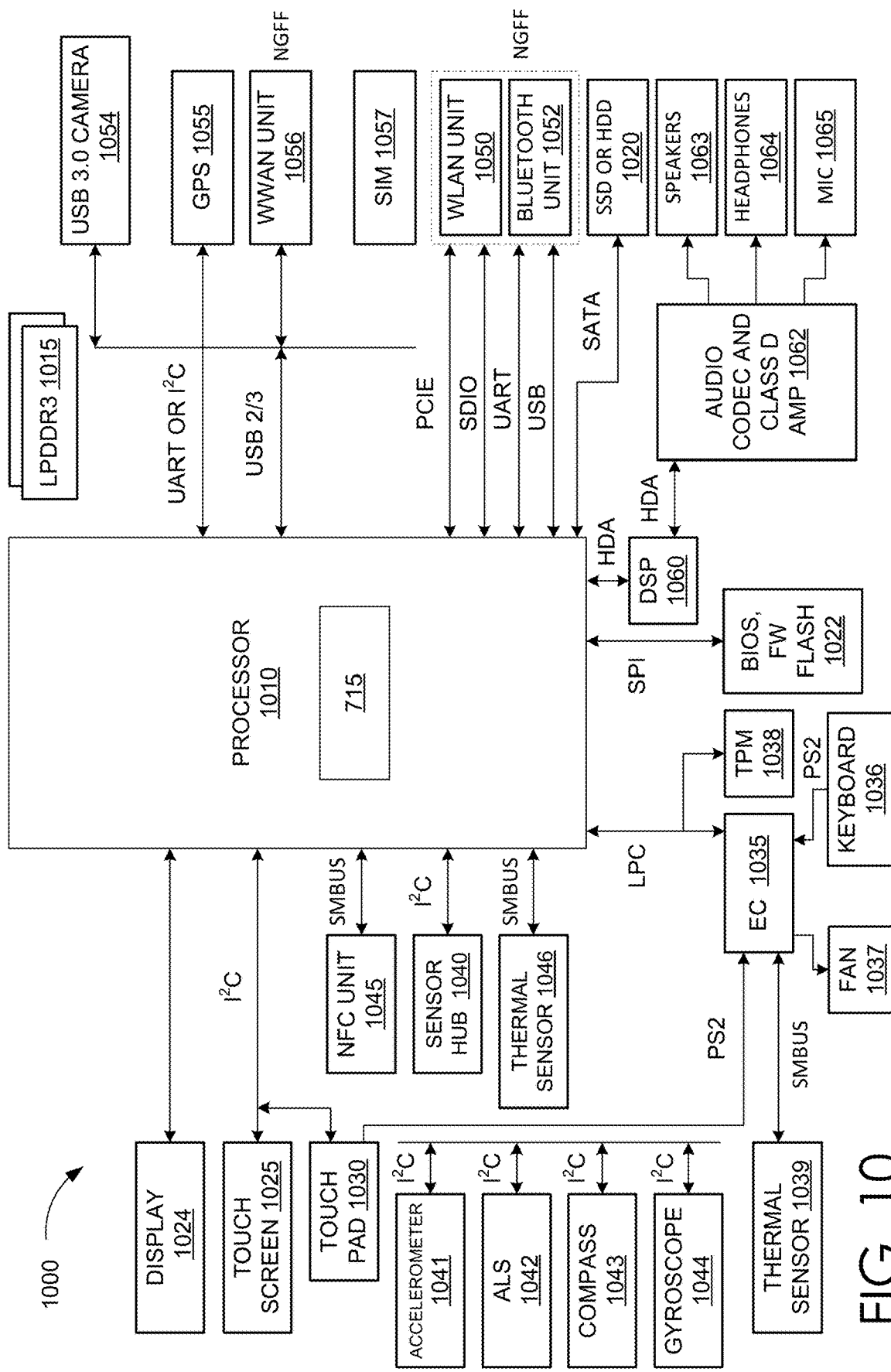
FIG. 10 illustrates a computer system, according to at least one embodiment.

FIG. 10 is a block diagram illustrating an electronic device 1000 for using a processor 1010, according to at least one embodiment. In at least one embodiment, electronic device 1000 may be, for example and without limitation, a notebook, a tower server, a rack server, a blade server, a laptop, a desktop, a tablet, a mobile device, a phone, an embedded computer, or any other suitable electronic device.

In at least one embodiment, system 1000 may include, without limitation, processor 1010 communicatively coupled to any suitable number or kind of components, peripherals, modules, or devices. In at least one embodiment, processor 1010 coupled using a bus or interface, such as a 1° C. bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3), or a Universal Asynchronous Receiver/Transmitter ("UART") bus. In at least one embodiment, FIG. 10 illustrates a system, which includes interconnected hardware devices or "chips", whereas in other embodiments, FIG. 10 may illustrate an exemplary System on a Chip ("SoC"). In at least one embodiment, devices illustrated in FIG. 10 may be interconnected with proprietary interconnects, standardized interconnects (e.g., PCIe) or some combination thereof. In at least one embodiment, one or more components of FIG. 10 are interconnected using compute express link (CXL) interconnects.

In at least one embodiment, FIG. 10 may include a display 1024, a touch screen 1025, a touch pad 1030, a Near Field Communications unit ("NFC") 1045, a sensor hub 1040, a thermal sensor 1046, an Express Chipset ("EC") 1035, a Trusted Platform Module ("TPM") 1038, BIOS/firmware/flash memory ("BIOS, FW Flash") 1022, a DSP 1060, a drive 1020 such as a Solid State Disk ("SSD") or a Hard Disk Drive ("HDD"), a wireless local area network unit ("WLAN") 1050, a Bluetooth unit 1052, a Wireless Wide Area Network unit ("WWAN") 1056, a Global Positioning System (GPS) 1055, a camera ("USB 3.0 camera") 1054 such as a USB 3.0 camera, and/or a Low Power Double Data Rate ("LPDDR") memory unit ("LPDDR3") 1015 implemented in, for example, LPDDR3 standard. These components may each be implemented in any suitable manner.

In at least one embodiment, other components may be communicatively coupled to processor 1010 through components discussed above. In at least one embodiment, an accelerometer 1041, Ambient Light Sensor ("ALS") 1042, compass 1043, and a gyroscope 1044 may be communicatively coupled to sensor hub 1040. In at least one embodiment, thermal sensor 1039, a fan 1037, a keyboard 1036, and a touch pad 1030 may be communicatively coupled to EC 1035. In at least one embodiment, speaker 1063, headphones 1064, and microphone ("mic") 1065 may be communicatively coupled to an audio unit ("audio codec and class d amp") 1062, which may in turn be communicatively coupled to DSP 1060. In at least one embodiment, audio unit 1064 may include, for example and without limitation, an audio coder/decoder ("codec") and a class D amplifier. In at least one embodiment, SIM card ("SIM") 1057 may be communicatively coupled to WWAN unit 1056. In at least one embodiment, components such as WLAN unit 1050 and Bluetooth unit 1052, as well as WWAN unit 1056 may be implemented in a Next Generation Form Factor ("NGFF").

Inference and/or training logic 715 are used to perform inferencing and/or training operations associated with one or more embodiments. Details regarding inference and/or training logic 715 are provided below in conjunction with FIGS. 7A and/or 7B. In at least one embodiment, inference and/or training logic 715 may be used in system FIG. 10 for inferencing or predicting operations based, at least in part, on weight parameters calculated using neural network training operations, neural network functions and/or architectures, or neural network use cases described herein.

Such components can be used to reconstruct an implicit 3D surface by generating a density field based on weighted contributions of density functions for a plurality of oriented surface points.

Figure 11:
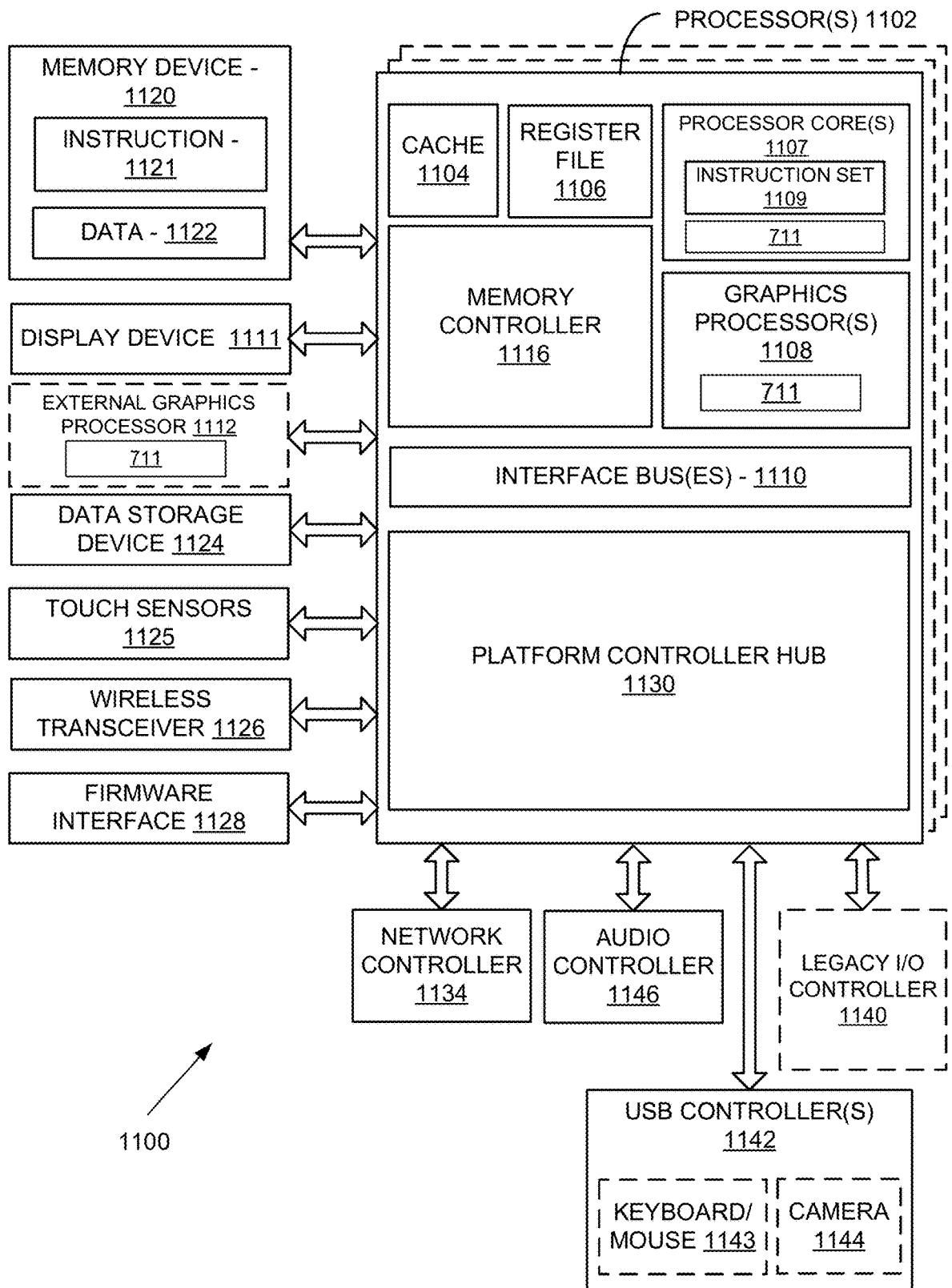
FIG. 11 illustrates at least portions of a graphics processor, according to one or more embodiments.

FIG. 11 is a block diagram of a processing system, according to at least one embodiment. In at least one embodiment, system 1100 includes one or more processors 1102 and one or more graphics processors 1108, and may be a single processor desktop system, a multiprocessor workstation system, or a server system having a large number of processors 1102 or processor cores 1107. In at least one embodiment, system 1100 is a processing platform incorporated within a system-on-a-chip (SoC) integrated circuit for use in mobile, handheld, or embedded devices.

In at least one embodiment, system 1100 can include, or be incorporated within a server-based gaming platform, a game console, including a game and media console, a mobile gaming console, a handheld game console, or an online game console. In at least one embodiment, system 1100 is a mobile phone, smart phone, tablet computing device or mobile Internet device. In at least one embodiment, processing system 1100 can also include, couple with, or be integrated within a wearable device, such as a smart watch wearable device, smart eyewear device, augmented reality device, or virtual reality device. In at least one embodiment, processing system 1100 is a television or set top box device having one or more processors 1102 and a graphical interface generated by one or more graphics processors 1108.

In at least one embodiment, one or more processors 1102 each include one or more processor cores 1107 to process instructions which, when executed, perform operations for system and user software. In at least one embodiment, each of one or more processor cores 1107 is configured to process a specific instruction set 1109. In at least one embodiment, instruction set 1109 may facilitate Complex Instruction Set Computing (CISC), Reduced Instruction Set Computing (RISC), or computing via a Very Long Instruction Word (VLIW). In at least one embodiment, processor cores 1107 may each process a different instruction set 1109, which may include instructions to facilitate emulation of other instruction sets. In at least one embodiment, processor core 1107 may also include other processing devices, such a Digital Signal Processor (DSP).

In at least one embodiment, processor 1102 includes cache memory 1104. In at least one embodiment, processor 1102 can have a single internal cache or multiple levels of internal cache. In at least one embodiment, cache memory is shared among various components of processor 1102. In at least one embodiment, processor 1102 also uses an external cache (e.g., a Level-3 (L3) cache or Last Level Cache (LLC)) (not shown), which may be shared among processor cores 1107 using known cache coherency techniques. In at least one embodiment, register file 1106 is additionally included in processor 1102 which may include different types of registers for storing different types of data (e.g., integer registers, floating point registers, status registers, and an instruction pointer register). In at least one embodiment, register file 1106 may include general-purpose registers or other registers.

In at least one embodiment, one or more processor(s) 1102 are coupled with one or more interface bus(es) 1110 to transmit communication signals such as address, data, or control signals between processor 1102 and other components in system 1100. In at least one embodiment, interface bus 1110, in one embodiment, can be a processor bus, such as a version of a Direct Media Interface (DMI) bus. In at least one embodiment, interface 1110 is not limited to a DMI bus, and may include one or more Peripheral Component Interconnect buses (e.g., PCI, PCI Express), memory busses, or other types of interface busses. In at least one embodiment processor(s) 1102 include an integrated memory controller 1116 and a platform controller hub 1130. In at least one embodiment, memory controller 1116 facilitates communication between a memory device and other components of system 1100, while platform controller hub (PCH) 1130 provides connections to I/O devices via a local I/O bus.

In at least one embodiment, memory device 1120 can be a dynamic random access memory (DRAM) device, a static random access memory (SRAM) device, flash memory device, phase-change memory device, or some other memory device having suitable performance to serve as process memory. In at least one embodiment memory device 1120 can operate as system memory for system 1100, to store data 1122 and instructions 1121 for use when one or more processors 1102 executes an application or process. In at least one embodiment, memory controller 1116 also couples with an optional external graphics processor 1112, which may communicate with one or more graphics processors 1108 in processors 1102 to perform graphics and media operations. In at least one embodiment, a display device 1111 can connect to processor(s) 1102. In at least one embodiment display device 1111 can include one or more of an internal display device, as in a mobile electronic device or a laptop device or an external display device attached via a display interface (e.g., DisplayPort, etc.). In at least one embodiment, display device 1111 can include a head mounted display (HMD) such as a stereoscopic display device for use in virtual reality (VR) applications or augmented reality (AR) applications.

In at least one embodiment, platform controller hub 1130 allows peripherals to connect to memory device 1120 and processor 1102 via a high-speed I/O bus. In at least one embodiment, I/O peripherals include, but are not limited to, an audio controller 1146, a network controller 1134, a firmware interface 1128, a wireless transceiver 1126, touch sensors 1125, a data storage device 1124 (e.g., hard disk drive, flash memory, etc.). In at least one embodiment, data storage device 1124 can connect via a storage interface (e.g., SATA) or via a peripheral bus, such as a Peripheral Component Interconnect bus (e.g., PCI, PCI Express). In at least one embodiment, touch sensors 1125 can include touch screen sensors, pressure sensors, or fingerprint sensors. In at least one embodiment, wireless transceiver 1126 can be a Wi-Fi transceiver, a Bluetooth transceiver, or a mobile network transceiver such as a 3G, 4G, or Long Term Evolution (LTE) transceiver. In at least one embodiment, firmware interface 1128 allows communication with system firmware, and can be, for example, a unified extensible firmware interface (UEFI). In at least one embodiment, network controller 1134 can allow a network connection to a wired network. In at least one embodiment, a high-performance network controller (not shown) couples with interface bus 1110. In at least one embodiment, audio controller 1146 is a multi-channel high definition audio controller. In at least one embodiment, system 1100 includes an optional legacy I/O controller 1140 for coupling legacy (e.g., Personal System 2 (PS/2)) devices to system. In at least one embodiment, platform controller hub 1130 can also connect to one or more Universal Serial Bus (USB) controllers 1142 connect input devices, such as keyboard and mouse 1143 combinations, a camera 1144, or other USB input devices.

In at least one embodiment, an instance of memory controller 1116 and platform controller hub 1130 may be integrated into a discreet external graphics processor, such as external graphics processor 1112. In at least one embodiment, platform controller hub 1130 and/or memory controller 1116 may be external to one or more processor(s) 1102. For example, in at least one embodiment, system 1100 can include an external memory controller 1116 and platform controller hub 1130, which may be configured as a memory controller hub and peripheral controller hub within a system chipset that is in communication with processor(s) 1102.

Inference and/or training logic 715 are used to perform inferencing and/or training operations associated with one or more embodiments. Details regarding inference and/or training logic 715 are provided below in conjunction with FIGS. 7A and/or 7B. In at least one embodiment portions or all of inference and/or training logic 715 may be incorporated into graphics processor 1500. For example, in at least one embodiment, training and/or inferencing techniques described herein may use one or more of ALUs embodied in a graphics processor. Moreover, in at least one embodiment, inferencing and/or training operations described herein may be done using logic other than logic illustrated in FIG. 7A or 7B. In at least one embodiment, weight parameters may be stored in on-chip or off-chip memory and/or registers (shown or not shown) that configure ALUs of a graphics processor to perform one or more machine learning algorithms, neural network architectures, use cases, or training techniques described herein.

Such components can be used to reconstruct an implicit 3D surface by generating a density field based on weighted contributions of density functions for a plurality of oriented surface points.

Figure 12:
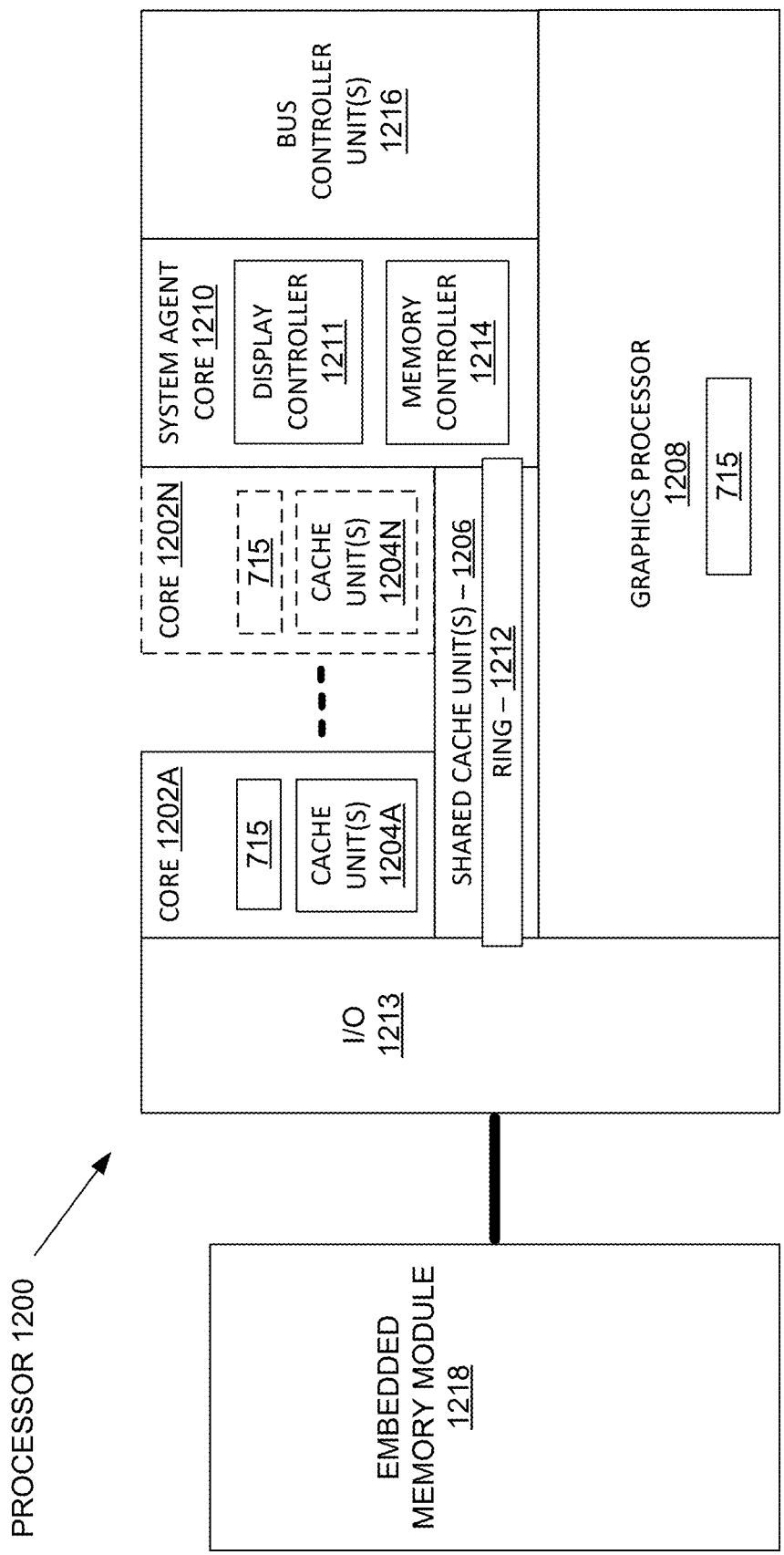
FIG. 12 illustrates at least portions of a graphics processor, according to one or more embodiments.

FIG. 12 is a block diagram of a processor 1200 having one or more processor cores 1202A-1202N, an integrated memory controller 1214, and an integrated graphics processor 1208, according to at least one embodiment. In at least one embodiment, processor 1200 can include additional cores up to and including additional core 1202N represented by dashed lined boxes. In at least one embodiment, each of processor cores 1202A-1202N includes one or more internal cache units 1204A-1204N. In at least one embodiment, each processor core also has access to one or more shared cached units 1206.

In at least one embodiment, internal cache units 1204A-1204N and shared cache units 1206 represent a cache memory hierarchy within processor 1200. In at least one embodiment, cache memory units 1204A-1204N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache units 1206 and 1204A-1204N.

In at least one embodiment, processor 1200 may also include a set of one or more bus controller units 1216 and a system agent core 1210. In at least one embodiment, one or more bus controller units 1216 manage a set of peripheral buses, such as one or more PCI or PCI express busses. In at least one embodiment, system agent core 1210 provides management functionality for various processor components. In at least one embodiment, system agent core 1210 includes one or more integrated memory controllers 1214 to manage access to various external memory devices (not shown).

In at least one embodiment, one or more of processor cores 1202A-1202N include support for simultaneous multi-threading. In at least one embodiment, system agent core 1210 includes components for coordinating and operating cores 1202A-1202N during multi-threaded processing. In at least one embodiment, system agent core 1210 may additionally include a power control unit (PCU), which includes logic and components to regulate one or more power states of processor cores 1202A-1202N and graphics processor 1208.

In at least one embodiment, processor 1200 additionally includes graphics processor 1208 to execute graphics processing operations. In at least one embodiment, graphics processor 1208 couples with shared cache units 1206, and system agent core 1210, including one or more integrated memory controllers 1214. In at least one embodiment, system agent core 1210 also includes a display controller 1211 to drive graphics processor output to one or more coupled displays. In at least one embodiment, display controller 1211 may also be a separate module coupled with graphics processor 1208 via at least one interconnect, or may be integrated within graphics processor 1208.

In at least one embodiment, a ring based interconnect unit 1212 is used to couple internal components of processor 1200. In at least one embodiment, an alternative interconnect unit may be used, such as a point-to-point interconnect, a switched interconnect, or other techniques. In at least one embodiment, graphics processor 1208 couples with ring interconnect 1212 via an I/O link 1213.

In at least one embodiment, I/O link 1213 represents at least one of multiple varieties of I/O interconnects, including an on package I/O interconnect which facilitates communication between various processor components and a high-performance embedded memory module 1218, such as an eDRAM module. In at least one embodiment, each of processor cores 1202A-1202N and graphics processor 1208 use embedded memory modules 1218 as a shared Last Level Cache.

In at least one embodiment, processor cores 1202A-1202N are homogenous cores executing a common instruction set architecture. In at least one embodiment, processor cores 1202A-1202N are heterogeneous in terms of instruction set architecture (ISA), where one or more of processor cores 1202A-1202N execute a common instruction set, while one or more other cores of processor cores 1202A-1202N executes a subset of a common instruction set or a different instruction set. In at least one embodiment, processor cores 1202A-1202N are heterogeneous in terms of microarchitecture, where one or more cores having a relatively higher power consumption couple with one or more power cores having a lower power consumption. In at least one embodiment, processor 1200 can be implemented on one or more chips or as an SoC integrated circuit.

Inference and/or training logic 715 are used to perform inferencing and/or training operations associated with one or more embodiments. Details regarding inference and/or training logic 715 are provided below in conjunction with FIGS. 7A and/or 7B. In at least one embodiment portions or all of inference and/or training logic 715 may be incorporated into processor 1200. For example, in at least one embodiment, training and/or inferencing techniques described herein may use one or more of ALUs embodied in graphics processor 1212, graphics core(s) 1202A-1202N, or other components in FIG. 12. Moreover, in at least one embodiment, inferencing and/or training operations described herein may be done using logic other than logic illustrated in FIG. 7A or 7B. In at least one embodiment, weight parameters may be stored in on-chip or off-chip memory and/or registers (shown or not shown) that configure ALUs of graphics processor 1200 to perform one or more machine learning algorithms, neural network architectures, use cases, or training techniques described herein.

Such components can be used to reconstruct an implicit 3D surface by generating a density field based on weighted contributions of density functions for a plurality of oriented surface points.

Virtualized Computing Platform

Figure 13:
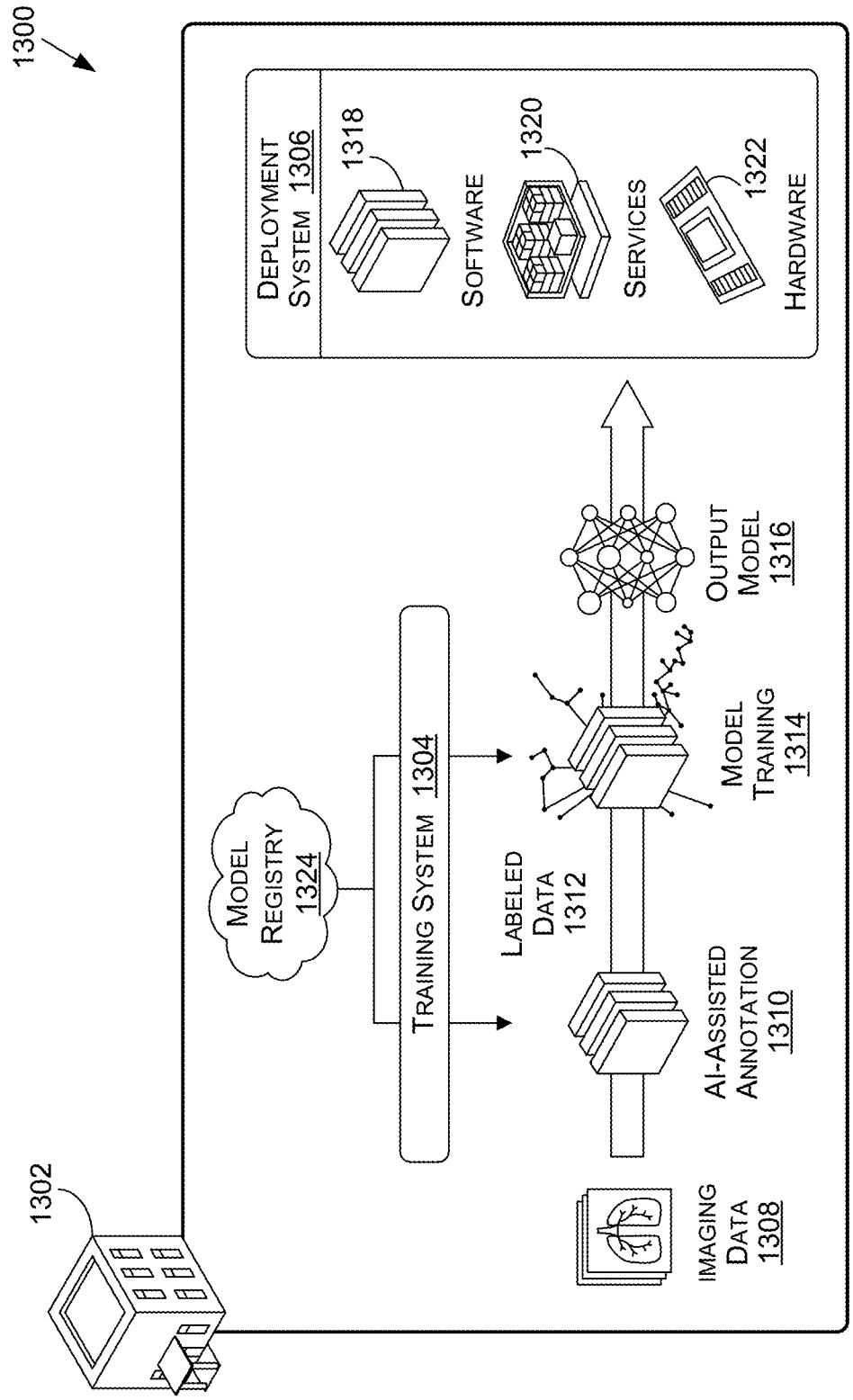
FIG. 13 is an example data flow diagram for an advanced computing pipeline, in accordance with at least one embodiment.

FIG. 13 is an example data flow diagram for a process 1300 of generating and deploying an image processing and inferencing pipeline, in accordance with at least one embodiment. In at least one embodiment, process 1300 may be deployed for use with imaging devices, processing devices, and/or other device types at one or more facilities 1302. Process 1300 may be executed within a training system 1304 and/or a deployment system 1306. In at least one embodiment, training system 1304 may be used to perform training, deployment, and implementation of machine learning models (e.g., neural networks, object detection algorithms, computer vision algorithms, etc.) for use in deployment system 1306. In at least one embodiment, deployment system 1306 may be configured to offload processing and compute resources among a distributed computing environment to reduce infrastructure requirements at facility 1302. In at least one embodiment, one or more applications in a pipeline may use or call upon services (e.g., inference, visualization, compute, AI, etc.) of deployment system 1306 during execution of applications.

In at least one embodiment, some of applications used in advanced processing and inferencing pipelines may use machine learning models or other AI to perform one or more processing steps. In at least one embodiment, machine learning models may be trained at facility 1302 using data 1308 (such as imaging data) generated at facility 1302 (and stored on one or more picture archiving and communication system (PACS) servers at facility 1302), may be trained using imaging or sequencing data 1308 from another facility(ies), or a combination thereof. In at least one embodiment, training system 1304 may be used to provide applications, services, and/or other resources for generating working, deployable machine learning models for deployment system 1306.

In at least one embodiment, model registry 1324 may be backed by object storage that may support versioning and object metadata. In at least one embodiment, object storage may be accessible through, for example, a cloud storage (e.g., cloud 1226 of FIG. 12) compatible application programming interface (API) from within a cloud platform. In at least one embodiment, machine learning models within model registry 1324 may uploaded, listed, modified, or deleted by developers or partners of a system interacting with an API. In at least one embodiment, an API may provide access to methods that allow users with appropriate credentials to associate models with applications, such that models may be executed as part of execution of containerized instantiations of applications.

In at least one embodiment, training pipeline 1304 (FIG. 13) may include a scenario where facility 1302 is training their own machine learning model, or has an existing machine learning model that needs to be optimized or updated. In at least one embodiment, imaging data 1308 generated by imaging device(s), sequencing devices, and/or other device types may be received. In at least one embodiment, once imaging data 1308 is received, AI-assisted annotation 1310 may be used to aid in generating annotations corresponding to imaging data 1308 to be used as ground truth data for a machine learning model. In at least one embodiment, AI-assisted annotation 1310 may include one or more machine learning models (e.g., convolutional neural networks (CNNs)) that may be trained to generate annotations corresponding to certain types of imaging data 1308 (e.g., from certain devices). In at least one embodiment, AI-assisted annotations 1310 may then be used directly, or may be adjusted or fine-tuned using an annotation tool to generate ground truth data. In at least one embodiment, AI-assisted annotations 1310, labeled clinic data 1312, or a combination thereof may be used as ground truth data for training a machine learning model. In at least one embodiment, a trained machine learning model may be referred to as output model 1316, and may be used by deployment system 1306, as described herein.

In at least one embodiment, a training pipeline may include a scenario where facility 1302 needs a machine learning model for use in performing one or more processing tasks for one or more applications in deployment system 1306, but facility 1302 may not currently have such a machine learning model (or may not have a model that is optimized, efficient, or effective for such purposes). In at least one embodiment, an existing machine learning model may be selected from a model registry 1324. In at least one embodiment, model registry 1324 may include machine learning models trained to perform a variety of different inference tasks on imaging data. In at least one embodiment, machine learning models in model registry 1324 may have been trained on imaging data from different facilities than facility 1302 (e.g., facilities remotely located). In at least one embodiment, machine learning models may have been trained on imaging data from one location, two locations, or any number of locations. In at least one embodiment, when being trained on imaging data from a specific location, training may take place at that location, or at least in a manner that protects confidentiality of imaging data or restricts imaging data from being transferred off-premises. In at least one embodiment, once a model is trained—or partially trained—at one location, a machine learning model may be added to model registry 1324. In at least one embodiment, a machine learning model may then be retrained, or updated, at any number of other facilities, and a retrained or updated model may be made available in model registry 1324. In at least one embodiment, a machine learning model may then be selected from model registry 1324—and referred to as output model 1316—and may be used in deployment system 1306 to perform one or more processing tasks for one or more applications of a deployment system.

In at least one embodiment, a scenario may include facility 1302 requiring a machine learning model for use in performing one or more processing tasks for one or more applications in deployment system 1306, but facility 1302 may not currently have such a machine learning model (or may not have a model that is optimized, efficient, or effective for such purposes). In at least one embodiment, a machine learning model selected from model registry 1324 may not be fine-tuned or optimized for imaging data 1308 generated at facility 1302 because of differences in populations, robustness of training data used to train a machine learning model, diversity in anomalies of training data, and/or other issues with training data. In at least one embodiment, AI-assisted annotation 1310 may be used to aid in generating annotations corresponding to imaging data 1308 to be used as ground truth data for retraining or updating a machine learning model. In at least one embodiment, labeled data 1312 may be used as ground truth data for training a machine learning model. In at least one embodiment, retraining or updating a machine learning model may be referred to as model training 1314. In at least one embodiment, model training 1314—e.g., AI-assisted annotations 1310, labeled clinic data 1312, or a combination thereof—may be used as ground truth data for retraining or updating a machine learning model. In at least one embodiment, a trained machine learning model may be referred to as output model 1316, and may be used by deployment system 1306, as described herein.

In at least one embodiment, deployment system 1306 may include software 1318, services 1320, hardware 1322, and/or other components, features, and functionality. In at least one embodiment, deployment system 1306 may include a software "stack," such that software 1318 may be built on top of services 1320 and may use services 1320 to perform some or all of processing tasks, and services 1320 and software 1318 may be built on top of hardware 1322 and use hardware 1322 to execute processing, storage, and/or other compute tasks of deployment system 1306. In at least one embodiment, software 1318 may include any number of different containers, where each container may execute an instantiation of an application. In at least one embodiment, each application may perform one or more processing tasks in an advanced processing and inferencing pipeline (e.g., inferencing, object detection, feature detection, segmentation, image enhancement, calibration, etc.). In at least one embodiment, an advanced processing and inferencing pipeline may be defined based on selections of different containers that are desired or required for processing imaging data 1308, in addition to containers that receive and configure imaging data for use by each container and/or for use by facility 1302 after processing through a pipeline (e.g., to convert outputs back to a usable data type). In at least one embodiment, a combination of containers within software 1318 (e.g., that make up a pipeline) may be referred to as a virtual instrument (as described in more detail herein), and a virtual instrument may leverage services 1320 and hardware 1322 to execute some or all processing tasks of applications instantiated in containers.

In at least one embodiment, a data processing pipeline may receive input data (e.g., imaging data 1308) in a specific format in response to an inference request (e.g., a request from a user of deployment system 1306). In at least one embodiment, input data may be representative of one or more images, video, and/or other data representations generated by one or more imaging devices. In at least one embodiment, data may undergo pre-processing as part of data processing pipeline to prepare data for processing by one or more applications. In at least one embodiment, post-processing may be performed on an output of one or more inferencing tasks or other processing tasks of a pipeline to prepare an output data for a next application and/or to prepare output data for transmission and/or use by a user (e.g., as a response to an inference request). In at least one embodiment, inferencing tasks may be performed by one or more machine learning models, such as trained or deployed neural networks, which may include output models 1316 of training system 1304.

In at least one embodiment, tasks of data processing pipeline may be encapsulated in a container(s) that each represents a discrete, fully functional instantiation of an application and virtualized computing environment that is able to reference machine learning models. In at least one embodiment, containers or applications may be published into a private (e.g., limited access) area of a container registry (described in more detail herein), and trained or deployed models may be stored in model registry 1324 and associated with one or more applications. In at least one embodiment, images of applications (e.g., container images) may be available in a container registry, and once selected by a user from a container registry for deployment in a pipeline, an image may be used to generate a container for an instantiation of an application for use by a user's system.

In at least one embodiment, developers (e.g., software developers, clinicians, doctors, etc.) may develop, publish, and store applications (e.g., as containers) for performing image processing and/or inferencing on supplied data. In at least one embodiment, development, publishing, and/or storing may be performed using a software development kit (SDK) associated with a system (e.g., to ensure that an application and/or container developed is compliant with or compatible with a system). In at least one embodiment, an application that is developed may be tested locally (e.g., at a first facility, on data from a first facility) with an SDK which may support at least some of services 1320 as a system (e.g., system 1200 of FIG. 12). In at least one embodiment, because DICOM objects may contain anywhere from one to hundreds of images or other data types, and due to a variation in data, a developer may be responsible for managing (e.g., setting constructs for, building pre-processing into an application, etc.) extraction and preparation of incoming data. In at least one embodiment, once validated by system 1300 (e.g., for accuracy), an application may be available in a container registry for selection and/or implementation by a user to perform one or more processing tasks with respect to data at a facility (e.g., a second facility) of a user.

In at least one embodiment, developers may then share applications or containers through a network for access and use by users of a system (e.g., system 1300 of FIG. 13). In at least one embodiment, completed and validated applications or containers may be stored in a container registry and associated machine learning models may be stored in model registry 1324. In at least one embodiment, a requesting entity—who provides an inference or image processing request—may browse a container registry and/or model registry 1324 for an application, container, dataset, machine learning model, etc., select a desired combination of elements for inclusion in data processing pipeline, and submit an imaging processing request. In at least one embodiment, a request may include input data (and associated patient data, in some examples) that is necessary to perform a request, and/or may include a selection of application(s) and/or machine learning models to be executed in processing a request. In at least one embodiment, a request may then be passed to one or more components of deployment system 1306 (e.g., a cloud) to perform processing of data processing pipeline. In at least one embodiment, processing by deployment system 1306 may include referencing selected elements (e.g., applications, containers, models, etc.) from a container registry and/or model registry 1324. In at least one embodiment, once results are generated by a pipeline, results may be returned to a user for reference (e.g., for viewing in a viewing application suite executing on a local, on-premises workstation or terminal).

In at least one embodiment, to aid in processing or execution of applications or containers in pipelines, services 1320 may be leveraged. In at least one embodiment, services 1320 may include compute services, artificial intelligence (AI) services, visualization services, and/or other service types. In at least one embodiment, services 1320 may provide functionality that is common to one or more applications in software 1318, so functionality may be abstracted to a service that may be called upon or leveraged by applications. In at least one embodiment, functionality provided by services 1320 may run dynamically and more efficiently, while also scaling well by allowing applications to process data in parallel (e.g., using a parallel computing platform 1230 (FIG. 12)). In at least one embodiment, rather than each application that shares a same functionality offered by a service 1320 being required to have a respective instance of service 1320, service 1320 may be shared between and among various applications. In at least one embodiment, services may include an inference server or engine that may be used for executing detection or segmentation tasks, as non-limiting examples. In at least one embodiment, a model training service may be included that may provide machine learning model training and/or retraining capabilities. In at least one embodiment, a data augmentation service may further be included that may provide GPU accelerated data (e.g., DICOM, RIS, CIS, REST compliant, RPC, raw, etc.) extraction, resizing, scaling, and/or other augmentation. In at least one embodiment, a visualization service may be used that may add image rendering effects—such as ray-tracing, rasterization, denoising, sharpening, etc.—to add realism to two-dimensional (2D) and/or three-dimensional (3D) models. In at least one embodiment, virtual instrument services may be included that provide for beam-forming, segmentation, inferencing, imaging, and/or support for other applications within pipelines of virtual instruments.

In at least one embodiment, where a service 1320 includes an AI service (e.g., an inference service), one or more machine learning models may be executed by calling upon (e.g., as an API call) an inference service (e.g., an inference server) to execute machine learning model(s), or processing thereof, as part of application execution. In at least one embodiment, where another application includes one or more machine learning models for segmentation tasks, an application may call upon an inference service to execute machine learning models for performing one or more of processing operations associated with segmentation tasks. In at least one embodiment, software 1318 implementing advanced processing and inferencing pipeline that includes segmentation application and anomaly detection application may be streamlined because each application may call upon a same inference service to perform one or more inferencing tasks.

In at least one embodiment, hardware 1322 may include GPUs, CPUs, graphics cards, an AI/deep learning system (e.g., an AI supercomputer, such as NVIDIA's DGX), a cloud platform, or a combination thereof. In at least one embodiment, different types of hardware 1322 may be used to provide efficient, purpose-built support for software 1318 and services 1320 in deployment system 1306. In at least one embodiment, use of GPU processing may be implemented for processing locally (e.g., at facility 1302), within an AI/deep learning system, in a cloud system, and/or in other processing components of deployment system 1306 to improve efficiency, accuracy, and efficacy of image processing and generation. In at least one embodiment, software 1318 and/or services 1320 may be optimized for GPU processing with respect to deep learning, machine learning, and/or high-performance computing, as non-limiting examples. In at least one embodiment, at least some of computing environment of deployment system 1306 and/or training system 1304 may be executed in a datacenter one or more supercomputers or high performance computing systems, with GPU optimized software (e.g., hardware and software combination of NVIDIA's DGX System). In at least one embodiment, hardware 1322 may include any number of GPUs that may be called upon to perform processing of data in parallel, as described herein. In at least one embodiment, cloud platform may further include GPU processing for GPU-optimized execution of deep learning tasks, machine learning tasks, or other computing tasks. In at least one embodiment, cloud platform (e.g., NVIDIA's NGC) may be executed using an AI/deep learning supercomputer(s) and/or GPU-optimized software (e.g., as provided on NVIDIA's DGX Systems) as a hardware abstraction and scaling platform. In at least one embodiment, cloud platform may integrate an application container clustering system or orchestration system (e.g., KUBERNETES) on multiple GPUs to allow seamless scaling and load balancing.

Figure 14:
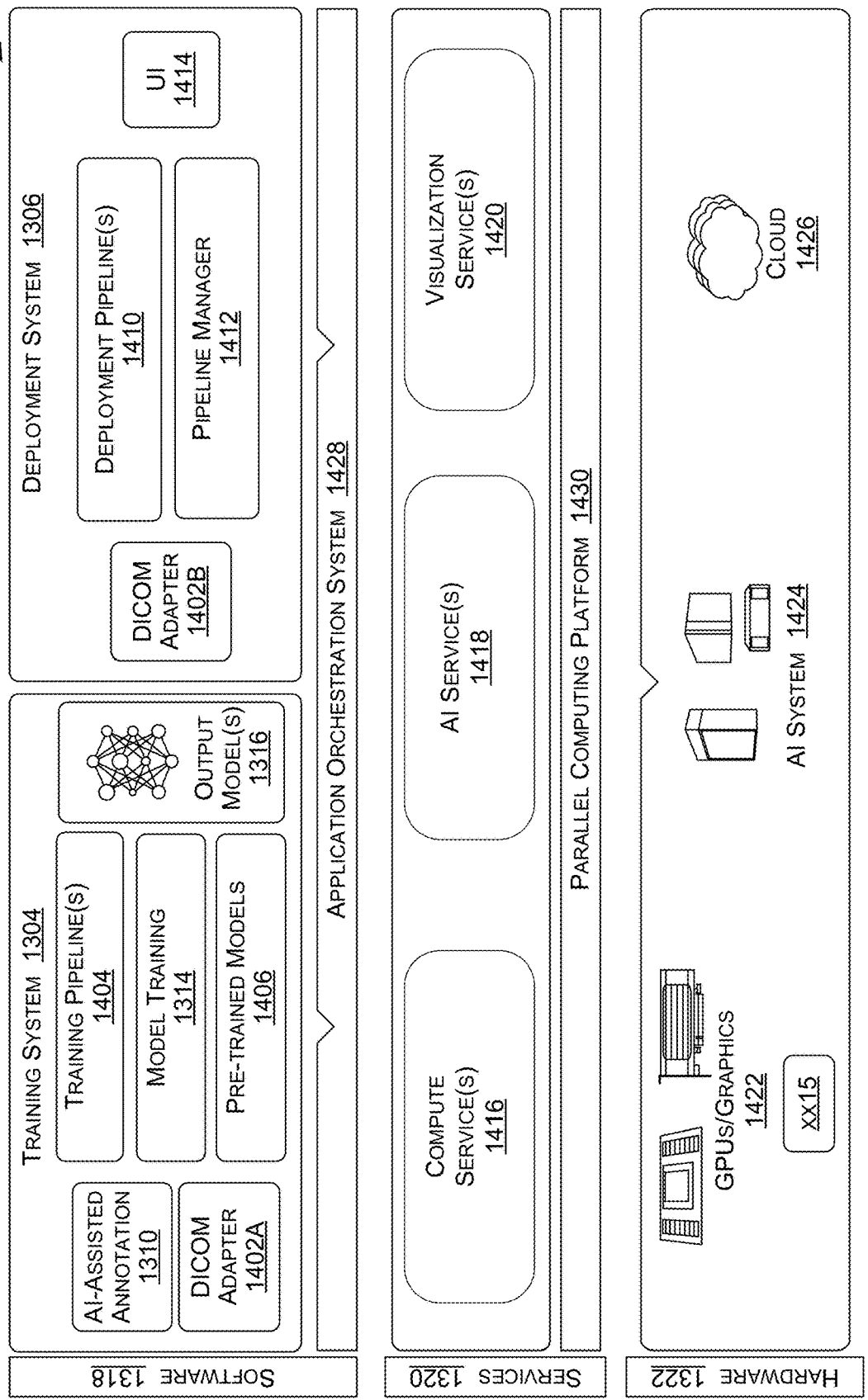
FIG. 14 is a system diagram for an example system for training, adapting, instantiating and deploying machine learning models in an advanced computing pipeline, in accordance with at least one embodiment.

FIG. 14 is a system diagram for an example system 1400 for generating and deploying an imaging deployment pipeline, in accordance with at least one embodiment. In at least one embodiment, system 1400 may be used to implement process 1300 of FIG. 13 and/or other processes including advanced processing and inferencing pipelines. In at least one embodiment, system 1400 may include training system 1304 and deployment system 1306. In at least one embodiment, training system 1304 and deployment system 1306 may be implemented using software 1318, services 1320, and/or hardware 1322, as described herein.

In at least one embodiment, system 1400 (e.g., training system 1304 and/or deployment system 1306) may implemented in a cloud computing environment (e.g., using cloud 1426). In at least one embodiment, system 1400 may be implemented locally with respect to a healthcare services facility, or as a combination of both cloud and local computing resources. In at least one embodiment, access to APIs in cloud 1426 may be restricted to authorized users through enacted security measures or protocols. In at least one embodiment, a security protocol may include web tokens that may be signed by an authentication (e.g., AuthN, AuthZ, Gluecon, etc.) service and may carry appropriate authorization. In at least one embodiment, APIs of virtual instruments (described herein), or other instantiations of system 1400, may be restricted to a set of public IPs that have been vetted or authorized for interaction.

In at least one embodiment, various components of system 1400 may communicate between and among one another using any of a variety of different network types, including but not limited to local area networks (LANs) and/or wide area networks (WANs) via wired and/or wireless communication protocols. In at least one embodiment, communication between facilities and components of system 1400 (e.g., for transmitting inference requests, for receiving results of inference requests, etc.) may be communicated over data bus(ses), wireless data protocols (Wi-Fi), wired data protocols (e.g., Ethernet), etc.

In at least one embodiment, training system 1304 may execute training pipelines 1404, similar to those described herein with respect to FIG. 13. In at least one embodiment, where one or more machine learning models are to be used in deployment pipelines 1410 by deployment system 1306, training pipelines 1404 may be used to train or retrain one or more (e.g. pre-trained) models, and/or implement one or more of pre-trained models 1406 (e.g., without a need for retraining or updating). In at least one embodiment, as a result of training pipelines 1404, output model(s) 1316 may be generated. In at least one embodiment, training pipelines 1404 may include any number of processing steps, such as but not limited to imaging data (or other input data) conversion or adaption In at least one embodiment, for different machine learning models used by deployment system 1306, different training pipelines 1404 may be used. In at least one embodiment, training pipeline 1404 similar to a first example described with respect to FIG. 13 may be used for a first machine learning model, training pipeline 1404 similar to a second example described with respect to FIG. 13 may be used for a second machine learning model, and training pipeline 1404 similar to a third example described with respect to FIG. 13 may be used for a third machine learning model. In at least one embodiment, any combination of tasks within training system 1304 may be used depending on what is required for each respective machine learning model. In at least one embodiment, one or more of machine learning models may already be trained and ready for deployment so machine learning models may not undergo any processing by training system 1304, and may be implemented by deployment system 1306.

In at least one embodiment, output model(s) 1316 and/or pre-trained model(s) 1406 may include any types of machine learning models depending on implementation or embodiment. In at least one embodiment, and without limitation, machine learning models used by system 1400 may include machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

In at least one embodiment, training pipelines 1404 may include AI-assisted annotation, as described in more detail herein with respect to at least FIG. 14. In at least one embodiment, labeled data 1312 (e.g., traditional annotation) may be generated by any number of techniques. In at least one embodiment, labels or other annotations may be generated within a drawing program (e.g., an annotation program), a computer aided design (CAD) program, a labeling program, another type of program suitable for generating annotations or labels for ground truth, and/or may be hand drawn, in some examples. In at least one embodiment, ground truth data may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines location of labels), and/or a combination thereof. In at least one embodiment, for each instance of imaging data 1308 (or other data type used by machine learning models), there may be corresponding ground truth data generated by training system 1304. In at least one embodiment, AI-assisted annotation may be performed as part of deployment pipelines 1410; either in addition to, or in lieu of AI-assisted annotation included in training pipelines 1404. In at least one embodiment, system 1400 may include a multi-layer platform that may include a software layer (e.g., software 1318) of diagnostic applications (or other application types) that may perform one or more medical imaging and diagnostic functions. In at least one embodiment, system 1400 may be communicatively coupled to (e.g., via encrypted links) PACS server networks of one or more facilities. In at least one embodiment, system 1400 may be configured to access and referenced data from PACS servers to perform operations, such as training machine learning models, deploying machine learning models, image processing, inferencing, and/or other operations.

In at least one embodiment, a software layer may be implemented as a secure, encrypted, and/or authenticated API through which applications or containers may be invoked (e.g., called) from an external environment(s) (e.g., facility 1302). In at least one embodiment, applications may then call or execute one or more services 1320 for performing compute, AI, or visualization tasks associated with respective applications, and software 1318 and/or services 1320 may leverage hardware 1322 to perform processing tasks in an effective and efficient manner.

In at least one embodiment, deployment system 1306 may execute deployment pipelines 1410. In at least one embodiment, deployment pipelines 1410 may include any number of applications that may be sequentially, non-sequentially, or otherwise applied to imaging data (and/or other data types) generated by imaging devices, sequencing devices, genomics devices, etc.—including AI-assisted annotation, as described above. In at least one embodiment, as described herein, a deployment pipeline 1410 for an individual device may be referred to as a virtual instrument for a device (e.g., a virtual ultrasound instrument, a virtual CT scan instrument, a virtual sequencing instrument, etc.). In at least one embodiment, for a single device, there may be more than one deployment pipeline 1410 depending on information desired from data generated by a device. In at least one embodiment, where detections of anomalies are desired from an MRI machine, there may be a first deployment pipeline 1410, and where image enhancement is desired from output of an MRI machine, there may be a second deployment pipeline 1410.

In at least one embodiment, an image generation application may include a processing task that includes use of a machine learning model. In at least one embodiment, a user may desire to use their own machine learning model, or to select a machine learning model from model registry 1324. In at least one embodiment, a user may implement their own machine learning model or select a machine learning model for inclusion in an application for performing a processing task. In at least one embodiment, applications may be selectable and customizable, and by defining constructs of applications, deployment and implementation of applications for a particular user are presented as a more seamless user experience. In at least one embodiment, by leveraging other features of system 1400—such as services 1320 and hardware 1322—deployment pipelines 1410 may be even more user friendly, provide for easier integration, and produce more accurate, efficient, and timely results.

In at least one embodiment, deployment system 1306 may include a user interface 1413 (e.g., a graphical user interface, a web interface, etc.) that may be used to select applications for inclusion in deployment pipeline(s) 1410, arrange applications, modify or change applications or parameters or constructs thereof, use and interact with deployment pipeline(s) 1410 during set-up and/or deployment, and/or to otherwise interact with deployment system 1306. In at least one embodiment, although not illustrated with respect to training system 1304, user interface 1414 (or a different user interface) may be used for selecting models for use in deployment system 1306, for selecting models for training, or retraining, in training system 1304, and/or for otherwise interacting with training system 1304.

In at least one embodiment, pipeline manager 1412 may be used, in addition to an application orchestration system 1428, to manage interaction between applications or containers of deployment pipeline(s) 1410 and services 1320 and/or hardware 1322. In at least one embodiment, pipeline manager 1412 may be configured to facilitate interactions from application to application, from application to service 1320, and/or from application or service to hardware 1322. In at least one embodiment, although illustrated as included in software 1318, this is not intended to be limiting, and in some examples pipeline manager 1412 may be included in services 1320. In at least one embodiment, application orchestration system 1428 (e.g., Kubernetes, DOCKER, etc.) may include a container orchestration system that may group applications into containers as logical units for coordination, management, scaling, and deployment. In at least one embodiment, by associating applications from deployment pipeline(s) 1410 (e.g., a reconstruction application, a segmentation application, etc.) with individual containers, each application may execute in a self-contained environment (e.g., at a kernel level) to increase speed and efficiency.

In at least one embodiment, each application and/or container (or image thereof) may be individually developed, modified, and deployed (e.g., a first user or developer may develop, modify, and deploy a first application and a second user or developer may develop, modify, and deploy a second application separate from a first user or developer), which may allow for focus on, and attention to, a task of a single application and/or container(s) without being hindered by tasks of another application(s) or container(s). In at least one embodiment, communication, and cooperation between different containers or applications may be aided by pipeline manager 1412 and application orchestration system 1428. In at least one embodiment, so long as an expected input and/or output of each container or application is known by a system (e.g., based on constructs of applications or containers), application orchestration system 1428 and/or pipeline manager 1412 may facilitate communication among and between, and sharing of resources among and between, each of applications or containers. In at least one embodiment, because one or more of applications or containers in deployment pipeline(s) 1410 may share same services and resources, application orchestration system 1428 may orchestrate, load balance, and determine sharing of services or resources between and among various applications or containers. In at least one embodiment, a scheduler may be used to track resource requirements of applications or containers, current usage or planned usage of these resources, and resource availability. In at least one embodiment, a scheduler may thus allocate resources to different applications and distribute resources between and among applications in view of requirements and availability of a system. In some examples, a scheduler (and/or other component of application orchestration system 1428) may determine resource availability and distribution based on constraints imposed on a system (e.g., user constraints), such as quality of service (QoS), urgency of need for data outputs (e.g., to determine whether to execute real-time processing or delayed processing), etc.

In at least one embodiment, services 1320 leveraged by and shared by applications or containers in deployment system 1306 may include compute services 1416, AI services 1418, visualization services 1420, and/or other service types. In at least one embodiment, applications may call (e.g., execute) one or more of services 1320 to perform processing operations for an application. In at least one embodiment, compute services 1416 may be leveraged by applications to perform super-computing or other high-performance computing (HPC) tasks. In at least one embodiment, compute service(s) 1416 may be leveraged to perform parallel processing (e.g., using a parallel computing platform 1430) for processing data through one or more of applications and/or one or more tasks of a single application, substantially simultaneously. In at least one embodiment, parallel computing platform 1430 (e.g., NVIDIA's CUDA) may allow general purpose computing on GPUs (GPGPU) (e.g., GPUs 1422). In at least one embodiment, a software layer of parallel computing platform 1430 may provide access to virtual instruction sets and parallel computational elements of GPUs, for execution of compute kernels. In at least one embodiment, parallel computing platform 1430 may include memory and, in some embodiments, a memory may be shared between and among multiple containers, and/or between and among different processing tasks within a single container. In at least one embodiment, inter-process communication (IPC) calls may be generated for multiple containers and/or for multiple processes within a container to use same data from a shared segment of memory of parallel computing platform 1430 (e.g., where multiple different stages of an application or multiple applications are processing same information). In at least one embodiment, rather than making a copy of data and moving data to different locations in memory (e.g., a read/write operation), same data in same location of a memory may be used for any number of processing tasks (e.g., at a same time, at different times, etc.). In at least one embodiment, as data is used to generate new data as a result of processing, this information of a new location of data may be stored and shared between various applications. In at least one embodiment, location of data and a location of updated or modified data may be part of a definition of how a payload is understood within containers.

In at least one embodiment, AI services 1418 may be leveraged to perform inferencing services for executing machine learning model(s) associated with applications (e.g., tasked with performing one or more processing tasks of an application). In at least one embodiment, AI services 1418 may leverage AI system 1424 to execute machine learning model(s) (e.g., neural networks, such as CNNs) for segmentation, reconstruction, object detection, feature detection, classification, and/or other inferencing tasks. In at least one embodiment, applications of deployment pipeline(s) 1410 may use one or more of output models 1316 from training system 1304 and/or other models of applications to perform inference on imaging data. In at least one embodiment, two or more examples of inferencing using application orchestration system 1428 (e.g., a scheduler) may be available. In at least one embodiment, a first category may include a high priority/low latency path that may achieve higher service level agreements, such as for performing inference on urgent requests during an emergency, or for a radiologist during diagnosis. In at least one embodiment, a second category may include a standard priority path that may be used for requests that may be non-urgent or where analysis may be performed at a later time. In at least one embodiment, application orchestration system 1428 may distribute resources (e.g., services 1320 and/or hardware 1322) based on priority paths for different inferencing tasks of AI services 1418.

In at least one embodiment, shared storage may be mounted to AI services 1418 within system 1400. In at least one embodiment, shared storage may operate as a cache (or other storage device type) and may be used to process inference requests from applications. In at least one embodiment, when an inference request is submitted, a request may be received by a set of API instances of deployment system 1306, and one or more instances may be selected (e.g., for best fit, for load balancing, etc.) to process a request. In at least one embodiment, to process a request, a request may be entered into a database, a machine learning model may be located from model registry 1324 if not already in a cache, a validation step may ensure appropriate machine learning model is loaded into a cache (e.g., shared storage), and/or a copy of a model may be saved to a cache. In at least one embodiment, a scheduler (e.g., of pipeline manager 1412) may be used to launch an application that is referenced in a request if an application is not already running or if there are not enough instances of an application. In at least one embodiment, if an inference server is not already launched to execute a model, an inference server may be launched. Any number of inference servers may be launched per model. In at least one embodiment, in a pull model, in which inference servers are clustered, models may be cached whenever load balancing is advantageous. In at least one embodiment, inference servers may be statically loaded in corresponding, distributed servers.

In at least one embodiment, inferencing may be performed using an inference server that runs in a container. In at least one embodiment, an instance of an inference server may be associated with a model (and optionally a plurality of versions of a model). In at least one embodiment, if an instance of an inference server does not exist when a request to perform inference on a model is received, a new instance may be loaded. In at least one embodiment, when starting an inference server, a model may be passed to an inference server such that a same container may be used to serve different models so long as inference server is running as a different instance.

In at least one embodiment, during application execution, an inference request for a given application may be received, and a container (e.g., hosting an instance of an inference server) may be loaded (if not already), and a start procedure may be called. In at least one embodiment, pre-processing logic in a container may load, decode, and/or perform any additional pre-processing on incoming data (e.g., using a CPU(s) and/or GPU(s)). In at least one embodiment, once data is prepared for inference, a container may perform inference as necessary on data. In at least one embodiment, this may include a single inference call on one image (e.g., a hand X-ray), or may require inference on hundreds of images (e.g., a chest CT). In at least one embodiment, an application may summarize results before completing, which may include, without limitation, a single confidence score, pixel level-segmentation, voxel-level segmentation, generating a visualization, or generating text to summarize findings. In at least one embodiment, different models or applications may be assigned different priorities. For example, some models may have a real-time (TAT<1 min) priority while others may have lower priority (e.g., TAT<10 min). In at least one embodiment, model execution times may be measured from requesting institution or entity and may include partner network traversal time, as well as execution on an inference service.

In at least one embodiment, transfer of requests between services 1320 and inference applications may be hidden behind a software development kit (SDK), and robust transport may be provide through a queue. In at least one embodiment, a request will be placed in a queue via an API for an individual application/tenant ID combination and an SDK will pull a request from a queue and give a request to an application. In at least one embodiment, a name of a queue may be provided in an environment from where an SDK will pick it up. In at least one embodiment, asynchronous communication through a queue may be useful as it may allow any instance of an application to pick up work as it becomes available. Results may be transferred back through a queue, to ensure no data is lost. In at least one embodiment, queues may also provide an ability to segment work, as highest priority work may go to a queue with most instances of an application connected to it, while lowest priority work may go to a queue with a single instance connected to it that processes tasks in an order received. In at least one embodiment, an application may run on a GPU-accelerated instance generated in cloud 1426, and an inference service may perform inferencing on a GPU.

In at least one embodiment, visualization services 1420 may be leveraged to generate visualizations for viewing outputs of applications and/or deployment pipeline(s) 1410. In at least one embodiment, GPUs 1422 may be leveraged by visualization services 1420 to generate visualizations. In at least one embodiment, rendering effects, such as ray-tracing, may be implemented by visualization services 1420 to generate higher quality visualizations. In at least one embodiment, visualizations may include, without limitation, 2D image renderings, 3D volume renderings, 3D volume reconstruction, 2D tomographic slices, virtual reality displays, augmented reality displays, etc. In at least one embodiment, virtualized environments may be used to generate a virtual interactive display or environment (e.g., a virtual environment) for interaction by users of a system (e.g., doctors, nurses, radiologists, etc.). In at least one embodiment, visualization services 1420 may include an internal visualizer, cinematics, and/or other rendering or image processing capabilities or functionality (e.g., ray tracing, rasterization, internal optics, etc.).

In at least one embodiment, hardware 1322 may include GPUs 1422, AI system 1424, cloud 1426, and/or any other hardware used for executing training system 1304 and/or deployment system 1306. In at least one embodiment, GPUs 1422 (e.g., NVIDIA's TESLA and/or QUADRO GPUs) may include any number of GPUs that may be used for executing processing tasks of compute services 1416, AI services 1418, visualization services 1420, other services, and/or any of features or functionality of software 1318. For example, with respect to AI services 1418, GPUs 1422 may be used to perform pre-processing on imaging data (or other data types used by machine learning models), post-processing on outputs of machine learning models, and/or to perform inferencing (e.g., to execute machine learning models). In at least one embodiment, cloud 1426, AI system 1424, and/or other components of system 1400 may use GPUs 1422. In at least one embodiment, cloud 1426 may include a GPU-optimized platform for deep learning tasks. In at least one embodiment, AI system 1424 may use GPUs, and cloud 1426—or at least a portion tasked with deep learning or inferencing—may be executed using one or more AI systems 1424. As such, although hardware 1322 is illustrated as discrete components, this is not intended to be limiting, and any components of hardware 1322 may be combined with, or leveraged by, any other components of hardware 1322.

In at least one embodiment, AI system 1424 may include a purpose-built computing system (e.g., a super-computer or an HPC) configured for inferencing, deep learning, machine learning, and/or other artificial intelligence tasks. In at least one embodiment, AI system 1424 (e.g., NVIDIA's DGX) may include GPU-optimized software (e.g., a software stack) that may be executed using a plurality of GPUs 1422, in addition to CPUs, RAM, storage, and/or other components, features, or functionality. In at least one embodiment, one or more AI systems 1424 may be implemented in cloud 1426 (e.g., in a data center) for performing some or all of AI-based processing tasks of system 1400.

In at least one embodiment, cloud 1426 may include a GPU-accelerated infrastructure (e.g., NVIDIA's NGC) that may provide a GPU-optimized platform for executing processing tasks of system 1400. In at least one embodiment, cloud 1426 may include an AI system(s) 1424 for performing one or more of AI-based tasks of system 1400 (e.g., as a hardware abstraction and scaling platform). In at least one embodiment, cloud 1426 may integrate with application orchestration system 1428 leveraging multiple GPUs to allow seamless scaling and load balancing between and among applications and services 1320. In at least one embodiment, cloud 1426 may tasked with executing at least some of services 1320 of system 1400, including compute services 1416, AI services 1418, and/or visualization services 1420, as described herein. In at least one embodiment, cloud 1426 may perform small and large batch inference (e.g., executing NVIDIA's TENSOR RT), provide an accelerated parallel computing API and platform 1430 (e.g., NVIDIA's CUDA), execute application orchestration system 1428 (e.g., KUBERNETES), provide a graphics rendering API and platform (e.g., for ray-tracing, 2D graphics, 3D graphics, and/or other rendering techniques to produce higher quality cinematics), and/or may provide other functionality for system 1400.

Figure 15A:
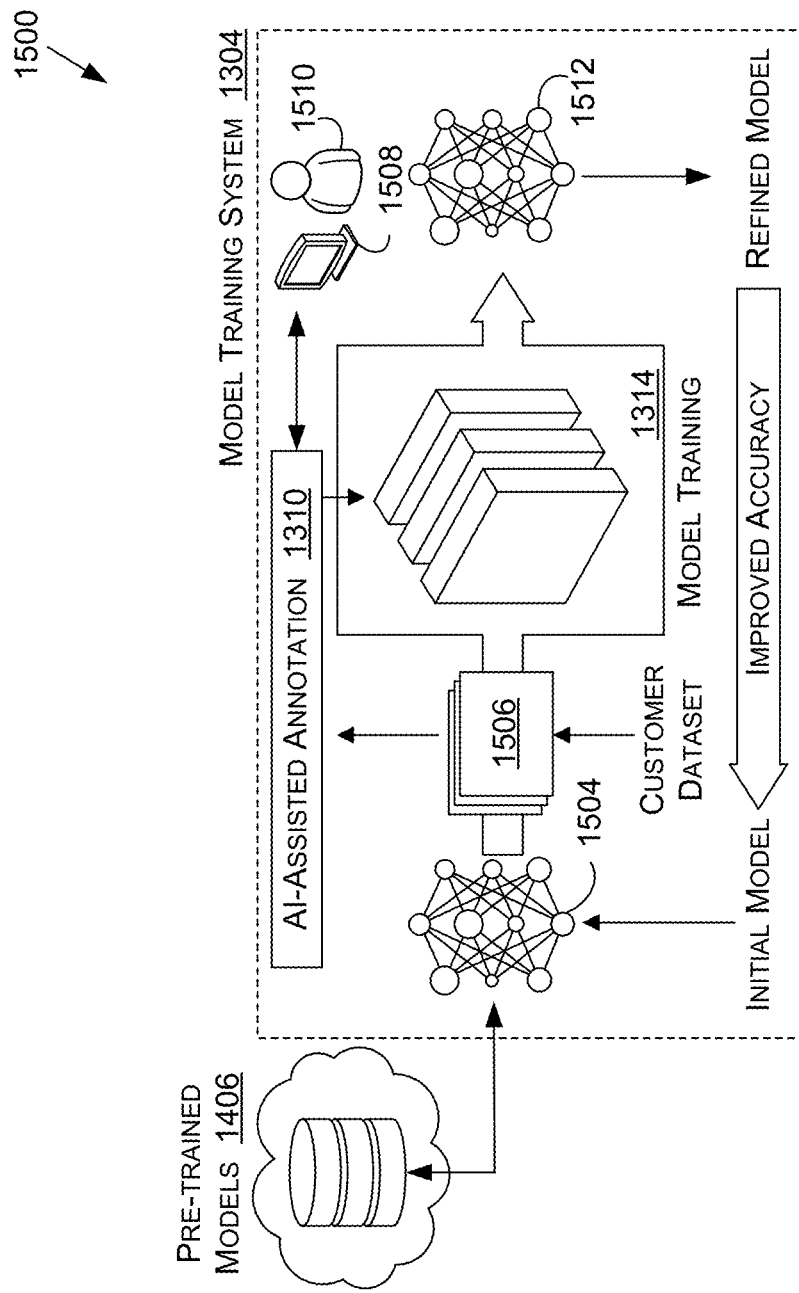
FIGS. 15A and 15B illustrate a data flow diagram for a process to train a machine learning model, as well as client-server architecture to enhance annotation tools with pre-trained annotation models, in accordance with at least one embodiment.

FIG. 15A illustrates a data flow diagram for a process 1500 to train, retrain, or update a machine learning model, in accordance with at least one embodiment. In at least one embodiment, process 1500 may be executed using, as a non-limiting example, system 1500 of FIG. 15A. In at least one embodiment, process 1500 may leverage services and/or hardware as described herein. In at least one embodiment, refined models 1512 generated by process 1500 may be executed by a deployment system for one or more containerized applications in deployment pipelines.

In at least one embodiment, model training 1514 may include retraining or updating an initial model 1504 (e.g., a pre-trained model) using new training data (e.g., new input data, such as customer dataset 1506, and/or new ground truth data associated with input data). In at least one embodiment, to retrain, or update, initial model 1504, output or loss layer(s) of initial model 1504 may be reset, or deleted, and/or replaced with an updated or new output or loss layer(s). In at least one embodiment, initial model 1504 may have previously fine-tuned parameters (e.g., weights and/or biases) that remain from prior training, so training or retraining 1514 may not take as long or require as much processing as training a model from scratch. In at least one embodiment, during model training 1514, by having reset or replaced output or loss layer(s) of initial model 1504, parameters may be updated and re-tuned for a new data set based on loss calculations associated with accuracy of output or loss layer(s) at generating predictions on new, customer dataset 1506.

In at least one embodiment, pre-trained models 1506 may be stored in a data store, or registry. In at least one embodiment, pre-trained models 1506 may have been trained, at least in part, at one or more facilities other than a facility executing process 1500. In at least one embodiment, to protect privacy and rights of patients, subjects, or clients of different facilities, pre-trained models 1506 may have been trained, on-premise, using customer or patient data generated on-premise. In at least one embodiment, pre-trained models 1306 may be trained using a cloud and/or other hardware, but confidential, privacy protected patient data may not be transferred to, used by, or accessible to any components of a cloud (or other off premise hardware). In at least one embodiment, where a pre-trained model 1506 is trained at using patient data from more than one facility, pre-trained model 1506 may have been individually trained for each facility prior to being trained on patient or customer data from another facility. In at least one embodiment, such as where a customer or patient data has been released of privacy concerns (e.g., by waiver, for experimental use, etc.), or where a customer or patient data is included in a public data set, a customer or patient data from any number of facilities may be used to train pre-trained model 1506 on-premise and/or off premise, such as in a datacenter or other cloud computing infrastructure.

In at least one embodiment, when selecting applications for use in deployment pipelines, a user may also select machine learning models to be used for specific applications. In at least one embodiment, a user may not have a model for use, so a user may select a pre-trained model to use with an application. In at least one embodiment, pre-trained model may not be optimized for generating accurate results on customer dataset 1506 of a facility of a user (e.g., based on patient diversity, demographics, types of medical imaging devices used, etc.). In at least one embodiment, prior to deploying a pre-trained model into a deployment pipeline for use with an application(s), pre-trained model may be updated, retrained, and/or fine-tuned for use at a respective facility.

In at least one embodiment, a user may select pre-trained model that is to be updated, retrained, and/or fine-tuned, and this pre-trained model may be referred to as initial model 1504 for a training system within process 1500. In at least one embodiment, a customer dataset 1506 (e.g., imaging data, genomics data, sequencing data, or other data types generated by devices at a facility) may be used to perform model training (which may include, without limitation, transfer learning) on initial model 1504 to generate refined model 1512. In at least one embodiment, ground truth data corresponding to customer dataset 1506 may be generated by training system 1304. In at least one embodiment, ground truth data may be generated, at least in part, by clinicians, scientists, doctors, practitioners, at a facility.

In at least one embodiment, AI-assisted annotation may be used in some examples to generate ground truth data. In at least one embodiment, AI-assisted annotation (e.g., implemented using an AI-assisted annotation SDK) may leverage machine learning models (e.g., neural networks) to generate suggested or predicted ground truth data for a customer dataset. In at least one embodiment, a user may use annotation tools within a user interface (a graphical user interface (GUI)) on a computing device.

In at least one embodiment, user 1510 may interact with a GUI via computing device 1508 to edit or fine-tune (auto)annotations. In at least one embodiment, a polygon editing feature may be used to move vertices of a polygon to more accurate or fine-tuned locations.

In at least one embodiment, once customer dataset 1506 has associated ground truth data, ground truth data (e.g., from AI-assisted annotation, manual labeling, etc.) may be used by during model training to generate refined model 1512. In at least one embodiment, customer dataset 1506 may be applied to initial model 1504 any number of times, and ground truth data may be used to update parameters of initial model 1504 until an acceptable level of accuracy is attained for refined model 1512. In at least one embodiment, once refined model 1512 is generated, refined model 1512 may be deployed within one or more deployment pipelines at a facility for performing one or more processing tasks with respect to medical imaging data.

In at least one embodiment, refined model 1512 may be uploaded to pre-trained models in a model registry to be selected by another facility. In at least one embodiment, his process may be completed at any number of facilities such that refined model 1512 may be further refined on new datasets any number of times to generate a more universal model.

Figure 15B:
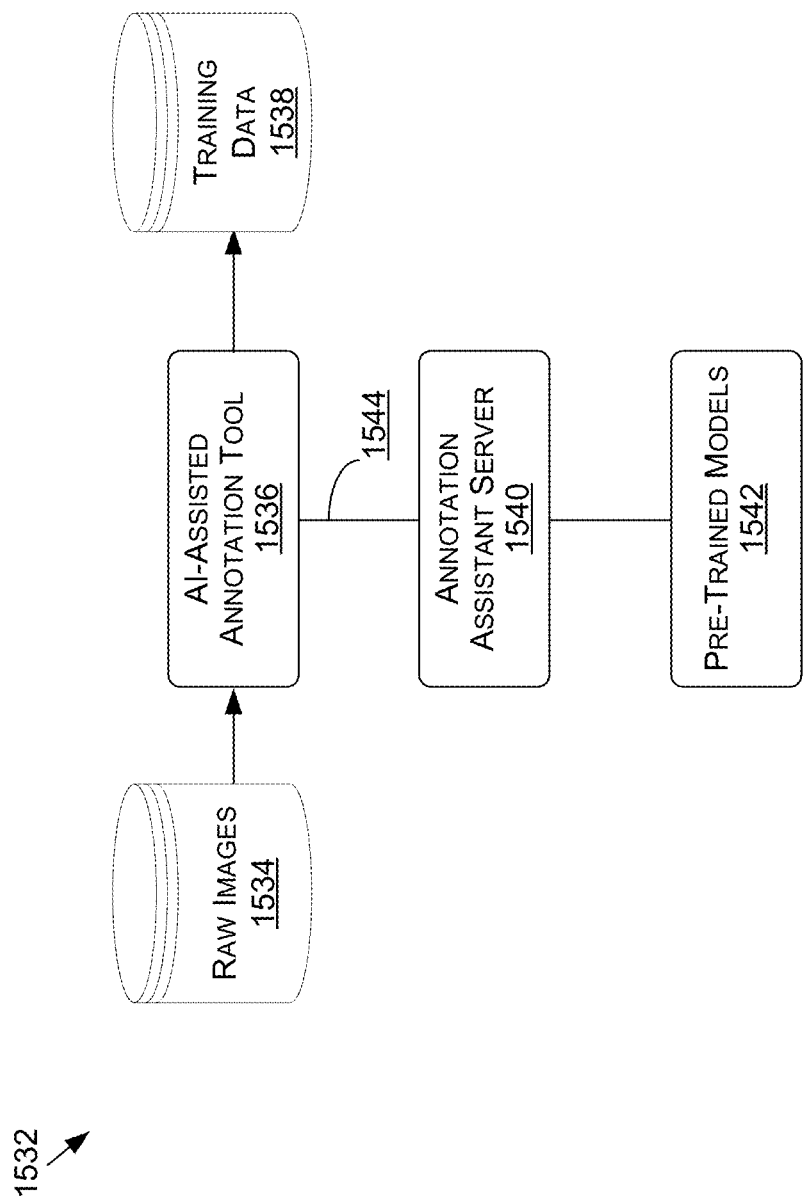

FIG. 15B is an example illustration of a client-server architecture 1532 to enhance annotation tools with pre-trained annotation models, in accordance with at least one embodiment. In at least one embodiment, AI-assisted annotation tools 1536 may be instantiated based on a client-server architecture 1532. In at least one embodiment, annotation tools 1536 in imaging applications may aid radiologists, for example, identify organs and abnormalities. In at least one embodiment, imaging applications may include software tools that help user 1510 to identify, as a non-limiting example, a few extreme points on a particular organ of interest in raw images 1534 (e.g., in a 3D MRI or CT scan) and receive auto-annotated results for all 2D slices of a particular organ. In at least one embodiment, results may be stored in a data store as training data 1538 and used as (for example and without limitation) ground truth data for training. In at least one embodiment, when computing device 1508 sends extreme points for AI-assisted annotation, a deep learning model, for example, may receive this data as input and return inference results of a segmented organ or abnormality. In at least one embodiment, pre-instantiated annotation tools, such as AI-Assisted Annotation Tool 1536B in FIG. 15B, may be enhanced by making API calls (e.g., API Call 1544) to a server, such as an Annotation Assistant Server 1540 that may include a set of pre-trained models 1542 stored in an annotation model registry, for example. In at least one embodiment, an annotation model registry may store pre-trained models 1542 (e.g., machine learning models, such as deep learning models) that are pre-trained to perform AI-assisted annotation on a particular organ or abnormality. These models may be further updated by using training pipelines. In at least one embodiment, pre-installed annotation tools may be improved over time as new labeled data is added.

Various embodiments can be described by the following clauses:

1. A computer-implemented method, comprising:
   obtaining a point cloud representation of a physical object;
   mapping individual points of the point cloud representation to voxels of a voxel hierarchy;
   providing the individual points of the point cloud as input to a trained density model;
   receiving, as output of the trained density model, density functions inferred for the individual points of the point cloud representation associated with respective voxels of the voxel hierarchy;

determining a weighted combination of the density functions to obtain a three-dimensional (3D) density field representation of the physical object; and generating a geometric reconstruction of the physical object based on values of the 3D density field representation.

2. The computer-implemented method of claim 1, wherein the geometric representation of the physical object is generated based on vertex points of the 3D density field representation having zero value or near-zero values.

3. The computer-implemented method of claim 2, wherein the vertex points correspond to corners of the voxels of the voxel hierarchy.

4. The computer-implemented method of claim 1, wherein the individual points of the point cloud representation are oriented points associated with surface normal vectors for the physical object.

5. The computer-implemented method of claim 1, wherein the geometric representation is a triangle mesh representative of a surface shape of the physical object.

6. The computer-implemented method of claim 1, further comprising:
calculating weights for the weighted combination of the density functions using a sparse linear system to calculate contributions of individual density functions inside respective voxels of the voxel hierarchy.

7. The computer-implemented method of claim 1, further comprising:
using the geometric reconstruction to render an image of the physical object.

8. The computer-implemented method of claim 1, further comprising:
scanning the physical object using a scanning device to generate the point cloud representation, the point cloud representation including oriented points in a multi-dimensional space.

9. The computer-implemented method of claim 1, further comprising:
using information for the physical object to generate a geometric mask to restrict a portion of multi-dimensional space that can be occupied by the density field.

10. A processor, comprising:
one or more circuits to:
map individual points of a point-based representation of a physical object to voxels of a voxel hierarchy;
provide the individual points as input to a trained density model;
receive, as output of the trained density model, density functions inferred for the individual points of the point-based representation associated with respective voxels of the voxel hierarchy;
determine a weighted combination of the density functions to obtain a density field representation of the physical object; and
generating a geometric reconstruction of the physical object based on values of the density field representation.

11. The processor of claim 10, wherein the geometric representation of the physical object is generated based on vertex points of the density field representation having zero value or near-zero values.

12. The processor of claim 11, wherein the vertex points correspond to corners of the voxels of the voxel hierarchy.

13. The processor of claim 10, wherein the individual points of the point-based representation are oriented points associated with surface normal vectors for the physical object.

14. The processor of claim 10, wherein the one or more circuits are further to:
calculate weights for the weighted combination of the density functions using a sparse linear system to calculate contributions of individual density functions inside respective voxels of the voxel hierarchy.

15. The processor of claim 11, wherein the processor is comprised in at least one of:
a system for performing simulation operations;
a system for performing simulation operations to test or validate autonomous machine applications;
a system for performing digital twin operations;
a system for performing light transport simulation;
a system for rendering graphical output;
a system for performing deep learning operations;
a system implemented using an edge device;
a system for generating or presenting virtual reality (VR) content;
a system for generating or presenting augmented reality (AR) content;
a system for generating or presenting mixed reality (MR) content;
a system incorporating one or more Virtual Machines (VMs);
a system implemented at least partially in a data center;
a system for performing hardware testing using simulation;
a system for synthetic data generation;
a collaborative content creation platform for 3D assets; or
a system implemented at least partially using cloud computing resources.

16. A system, comprising:
one or more processors to generate a digital reconstruction of a physical object based on a density field including a weighted combination of density functions, inferred using a density model, that are determined for voxels of a voxel hierarchy mapped to input points of a point cloud representation of the physical object.

17. The system of claim 16, wherein the geometric representation of the physical object is generated based on vertex points of the density field representation having zero value or near-zero values.

18. The system of claim 17, wherein the vertex points correspond to corners of the voxels of the voxel hierarchy.

19. The system of claim 16, wherein the one or more circuits are further to:
calculate weights for the weighted combination of the density functions using a sparse linear system to calculate contributions of individual density functions inside respective voxels of the voxel hierarchy.

20. The system of claim 16, wherein the system comprises at least one of:
a system for performing simulation operations;
a system for performing simulation operations to test or validate autonomous machine applications;
a system for performing digital twin operations;
a system for performing light transport simulation;
a system for rendering graphical output;
a system for performing deep learning operations;
a system implemented using an edge device;
a system for generating or presenting virtual reality (VR) content;
a system for generating or presenting augmented reality (AR) content;
a system for generating or presenting mixed reality (MR) content;

a system incorporating one or more Virtual Machines (VMs);

a system implemented at least partially in a data center;

a system for performing hardware testing using simulation;

a system for synthetic data generation;

a collaborative content creation platform for 3D assets; or a system implemented at least partially using cloud computing resources.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. Term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset," unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, term "plurality" indicates a state of being plural (e.g., "a plurality of items" indicates multiple items). A plurality is at least two items, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that allow performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. Obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A computer-implemented method, comprising:
    obtaining a point cloud representation of a physical object;
    mapping individual points of the point cloud representation to voxels of a voxel hierarchy;
    providing the individual points of the point cloud as input to a density model;
    receiving, as output of the density model, density functions inferred for the individual points of the point cloud representation associated with respective voxels at one or more positions of depth within the voxel hierarchy;
    determining a weighted combination of the density functions to obtain a three-dimensional (3D) density field representation of the physical object; and
    generating a geometric reconstruction of the physical object based on values of the 3D density field representation.

2. The computer-implemented method of claim 1, wherein the geometric reconstruction of the physical object is generated based on vertex points of the 3D density field representation corresponding to points at or proximate one or more surfaces of the physical object.

3. The computer-implemented method of claim 2, wherein the vertex points correspond to corner points of the voxels of the voxel hierarchy.

4. The computer-implemented method of claim 1, wherein the individual points of the point cloud representation are oriented points associated with surface normal vectors for the physical object.

5. The computer-implemented method of claim 1, wherein the geometric reconstruction is a triangle mesh representative of a surface shape of the physical object.

6. The computer-implemented method of claim 1, further comprising:
    calculating weights for the weighted combination of the density functions using a sparse linear system; and
    computing, based at least on the weighted combination that includes the calculated weights, contributions of individual density functions inside respective voxels of the voxel hierarchy.

7. The computer-implemented method of claim 1, further comprising:
    using the geometric reconstruction to render an image of the physical object.

8. The computer-implemented method of claim 1, further comprising:
    scanning the physical object using a scanning device to generate the point cloud representation, the point cloud representation including oriented points in a multi-dimensional space.

9. The computer-implemented method of claim 1, further comprising:
    using information for the physical object to generate a geometric mask to restrict a portion of multi-dimensional space that can be occupied by the density field.

10. A processor, comprising:
    one or more circuits to:
       map individual points of a point-based representation of a physical object to voxels of a voxel hierarchy;
       provide the individual points as input to a density model;

receive density functions inferred using the density model for the individual points of the point-based representation associated with respective voxels at one or more positions of depth within the voxel hierarchy;

determine a weighted combination of the density functions to obtain a density field representation of the physical object; and generate a geometric reconstruction of the physical object based on values of the density field representation.

11. The processor of claim 10, wherein the geometric reconstruction of the physical object is generated based on vertex points of the density field representation corresponding to points at or proximate one or more surfaces of the physical object.

12. The processor of claim 11, wherein the vertex points correspond to corners of the voxels of the voxel hierarchy.

13. The processor of claim 11, wherein the processor is comprised in at least one of:
- a system for performing simulation operations;
- a system for performing simulation operations to test or validate autonomous machine applications;
- a system for performing digital twin operations;
- a system for performing light transport simulation;
- a system for rendering graphical output;
- a system for performing deep learning operations;
- a system implemented using an edge device;
- a system for generating or presenting virtual reality (VR) content;
- a system for generating or presenting augmented reality (AR) content;
- a system for generating or presenting mixed reality (MR) content;
- a system incorporating one or more Virtual Machines (VMs);
- a system implemented at least partially in a data center;
- a system for performing hardware testing using simulation;
- a system for synthetic data generation;
- a collaborative content creation platform for 3D assets; or
- a system implemented at least partially using cloud computing resources.

14. The processor of claim 10, wherein the individual points of the point-based representation are oriented points associated with surface normal vectors for the physical object.

15. The processor of claim 10, wherein the one or more circuits are further to:
calculate weights for the weighted combination of the density functions using a sparse linear system to calculate contributions of individual density functions inside respective voxels of the voxel hierarchy.

16. A system, comprising:
one or more processors to generate a digital reconstruction of a physical object based on a density field including a weighted combination of density functions that are determined for voxels at one or more positions of depth within a voxel hierarchy mapped to input points of a point cloud representation of the physical object, the density functions being inferred using a density model.

17. The system of claim 16, wherein the digital reconstruction of the physical object is generated based on vertex points of the density field corresponding to points at or proximate one or more surfaces of the physical object.

18. The system of claim 17, wherein the vertex points correspond to corners of the voxels of the voxel hierarchy.

19. The system of claim 16, wherein the one or more processors are further to:
calculate weights for the weighted combination of the density functions using a sparse linear system to calculate contributions of individual density functions inside respective voxels of the voxel hierarchy.

20. The system of claim 16, wherein the system comprises at least one of:
- a system for performing simulation operations;
- a system for performing simulation operations to test or validate autonomous machine applications;
- a system for performing digital twin operations;
- a system for performing light transport simulation;
- a system for rendering graphical output;
- a system for performing deep learning operations;
- a system implemented using an edge device;
- a system for generating or presenting virtual reality (VR) content;
- a system for generating or presenting augmented reality (AR) content;
- a system for generating or presenting mixed reality (MR) content;
- a system incorporating one or more Virtual Machines (VMs);
- a system implemented at least partially in a data center;
- a system for performing hardware testing using simulation;
- a system for synthetic data generation;
- a collaborative content creation platform for 3D assets; or
- a system implemented at least partially using cloud computing resources.

* * * * *